(12) United States Patent
Morone et al.

(10) Patent No.: US 11,394,086 B2
(45) Date of Patent: Jul. 19, 2022

(54) BATTERY MODULE AND CONNECTION MEMBER

(71) Applicants: Kabushiki Kaisha Toshiba, Minato-ku (JP); Toshiba Infrastructure Systems & Solutions Corporation, Kawasaki (JP)

(72) Inventors: Masahito Morone, Tokorozawa (JP); Hirofumi Yamamoto, Warabi (JP); Tatsumi Matsuo, Kokubunji (JP); Motohiro Itou, Bunkyo (JP); Shinya Sato, Hachioji (JP); Kazuto Kuroda, Arakawa (JP); Ryo Okabe, Hino (JP); Norihiro Kaneko, Nerima (JP); Minoru Gyoda, Tokorozawa (JP); Yuji Sasaki, Yokohama (JP); Kota Asami, Fuchu (JP); Nobuyasu Negishi, Kashiwazaki (JP)

(73) Assignees: Kabushiki Kaisha Toshiba, Minato-ku (JP); Toshiba Infrastructure Systems & Solutions Corporation, Kawasaki (JP)

( * ) Notice: Subject to any disclaimer, the term of this patent is extended or adjusted under 35 U.S.C. 154(b) by 67 days.

(21) Appl. No.: 16/136,479

(22) Filed: Sep. 20, 2018

(65) Prior Publication Data
US 2019/0097202 A1    Mar. 28, 2019

(30) Foreign Application Priority Data

Sep. 27, 2017 (JP) .............................. JP2017-185803
Sep. 27, 2017 (JP) .............................. JP2017-185842
(Continued)

(51) Int. Cl.
*H01M 2/24*    (2006.01)
*H01M 50/502*    (2021.01)
(Continued)

(52) U.S. Cl.
CPC ....... *H01M 50/502* (2021.01); *H01M 10/049* (2013.01); *H01M 10/4207* (2013.01);
(Continued)

(58) Field of Classification Search
CPC ........ H01M 2/202; H01M 2/206; H01M 2/26; H01M 2/30; H01M 2/34; H01M 2/1077;
(Continued)

(56) References Cited

U.S. PATENT DOCUMENTS

2014/0162105 A1    6/2014    Klausmann et al.

FOREIGN PATENT DOCUMENTS

DE    10 2012 107 866 A1    2/2014
JP    03-208255    9/1991
(Continued)

OTHER PUBLICATIONS

Partial European Search Report dated Mar. 4, 2019 in European Patent Application No. 18196151.7. citing documents AA, AO, AP, And AQ therein, 19 pages.

*Primary Examiner* — Raymond Alejandro
(74) *Attorney, Agent, or Firm* — Oblon, McClelland, Maier & Neustadt, L.L.P.

(57) ABSTRACT

A battery module including a plurality of battery cells, a first chassis, and a connection member. The battery cells are aligned in a first direction. The first chassis includes a plurality of first compartments in which the battery cells are housed one by one, and at least one second compartment that is partitioned in the first direction. The connection member includes a body that is housed in the second compartment, a pair of connection terminals that is mounted on a first face of the body and is electrically connectable to the electrodes of the battery cells via a conductive member. The first face
(Continued)

faces in a second direction intersecting with the first direction, and a conductor that extends across the pair of connection terminals.

12 Claims, 15 Drawing Sheets

(30) Foreign Application Priority Data

Mar. 19, 2018 (JP) .............................. JP2018-050958
Mar. 22, 2018 (JP) .............................. JP2018-054728

(51) Int. Cl.
*H02J 7/04* (2006.01)
*H01M 10/04* (2006.01)
*H01M 10/42* (2006.01)
*H01M 50/20* (2021.01)
*H01M 50/531* (2021.01)
*H01M 50/543* (2021.01)
*H01M 50/572* (2021.01)

(52) U.S. Cl.
CPC ......... *H01M 50/20* (2021.01); *H01M 50/531* (2021.01); *H01M 50/543* (2021.01); *H01M 50/572* (2021.01); *H02J 7/045* (2013.01); *H01M 10/0445* (2013.01); *H01M 10/425* (2013.01); *H01M 2200/103* (2013.01)

(58) Field of Classification Search
CPC ........... H01M 10/049; H01M 10/4207; H01M 10/0445; H01M 10/425; H01M 2200/103; H01M 50/502; H01M 50/531; H01M 50/543; H01M 50/572; H01M 50/20; H02J 7/045
See application file for complete search history.

(56) References Cited

FOREIGN PATENT DOCUMENTS

| | | | |
|---|---|---|---|
| JP | 10-029172 | 2/1998 | |
| JP | 2012-146403 A | 8/2012 | |
| JP | 2012-221844 | 11/2012 | |
| JP | 2014-164812 | 9/2014 | |
| JP | 2014-203753 | * 10/2014 | .............. H01M 2/10 |
| JP | 2016-046018 | 4/2016 | |
| KR | 10-2015-0032077 A | 3/2015 | |

\* cited by examiner

BATTERY MODULE AND CONNECTION MEMBER

CROSS-REFERENCE TO RELATED APPLICATION

This application is based upon and claims the benefit of priority from Japanese Patent Application No. 2017-165803, filed Sep. 27, 2017, Japanese Patent Application No. 2017-185842, filed Sep. 27, 2017, Japanese Patent Application No. 2018-050958, filed Mar. 19, 2018 and Japanese Patent Application No. 2019-054728, filed Mar. 22, 2018, the entire contents of which are incorporated herein by reference.

FIELD

Embodiments described herein relate generally to a battery module and a connection member.

BACKGROUND

Conventionally, battery modules are known which include a plurality of battery cells, a chassis containing compartments in which the battery cells are housed, and dummy batteries (connection members) that are housed in the compartments together with the battery cells and that include connection terminals electrically connectable to the electrodes of the battery cells via conductive members.

It is preferable to provide a battery module with novel and improved features and less inconvenience, for example.

DETAILED DESCRIPTION

Figure 1:
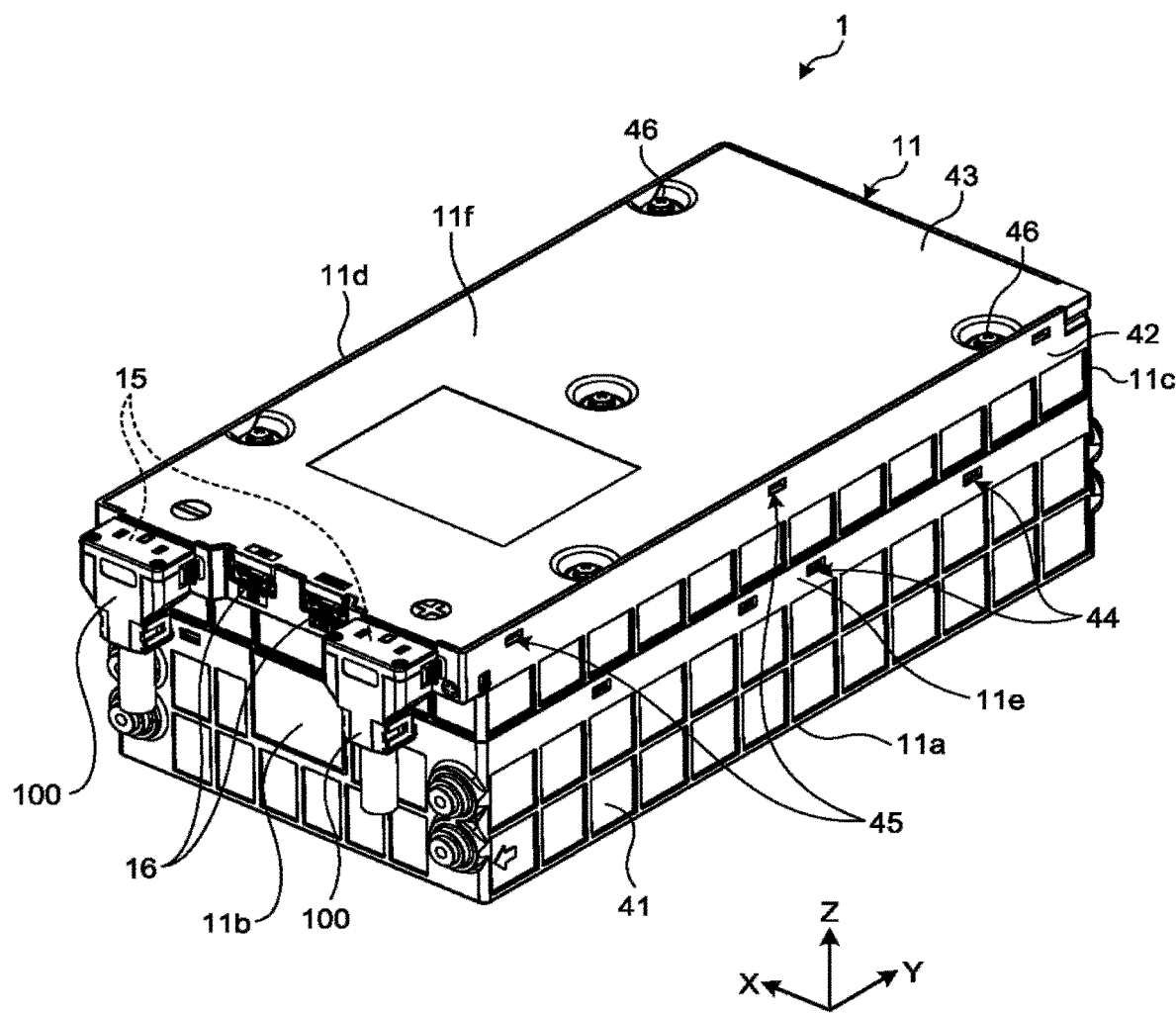
FIG. 1 is an exemplary and schematic perspective view of a battery module according to a first embodiment.

According to an embodiment, a battery module includes, for example, a plurality of battery cells, a first chassis, and a connection member. The battery cells are aligned in a first direction. The first chassis includes a plurality of first compartments in which the battery cells are housed one by one, and at least one second compartment that is partitioned in the first direction. The connection member includes a body that is housed in the second compartment; a pair of connection terminals that is mounted on a first face of the body and is electrically connectable to the electrodes of the battery cells via a conductive member, the first face facing in a second direction intersecting with the first direction; and a conductor that extends across the pair of connection terminals.

Exemplary embodiments of the present invention will now be disclosed. The features according to the embodiments described below and action and effects attained by the features are merely exemplary. In this specification, ordinal numbers are used to distinguish parts, elements, and members alone and are not intended to indicate order or priority.

Embodiments described below include same or like elements. The same or like elements are denoted by common reference numerals, and redundant explanations will be omitted. In the following drawings, three directions perpendicular to one another are defined. X direction is the width-direction (lateral direction) of a chassis 11 and the thickness direction of battery cells 12 and connection members 18. Y direction is the longitudinal direction of the chassis 11, and the width-direction of the battery cells 12 and the connection members 18. Z direction is the height direction of the chassis 11, and the height direction of the battery cells 12 and the connection members 18. The X direction is one example of a first direction, and the Y direction is one example of a third direction. The Z direction is one example of a second direction.

First Embodiment

Figure 2:
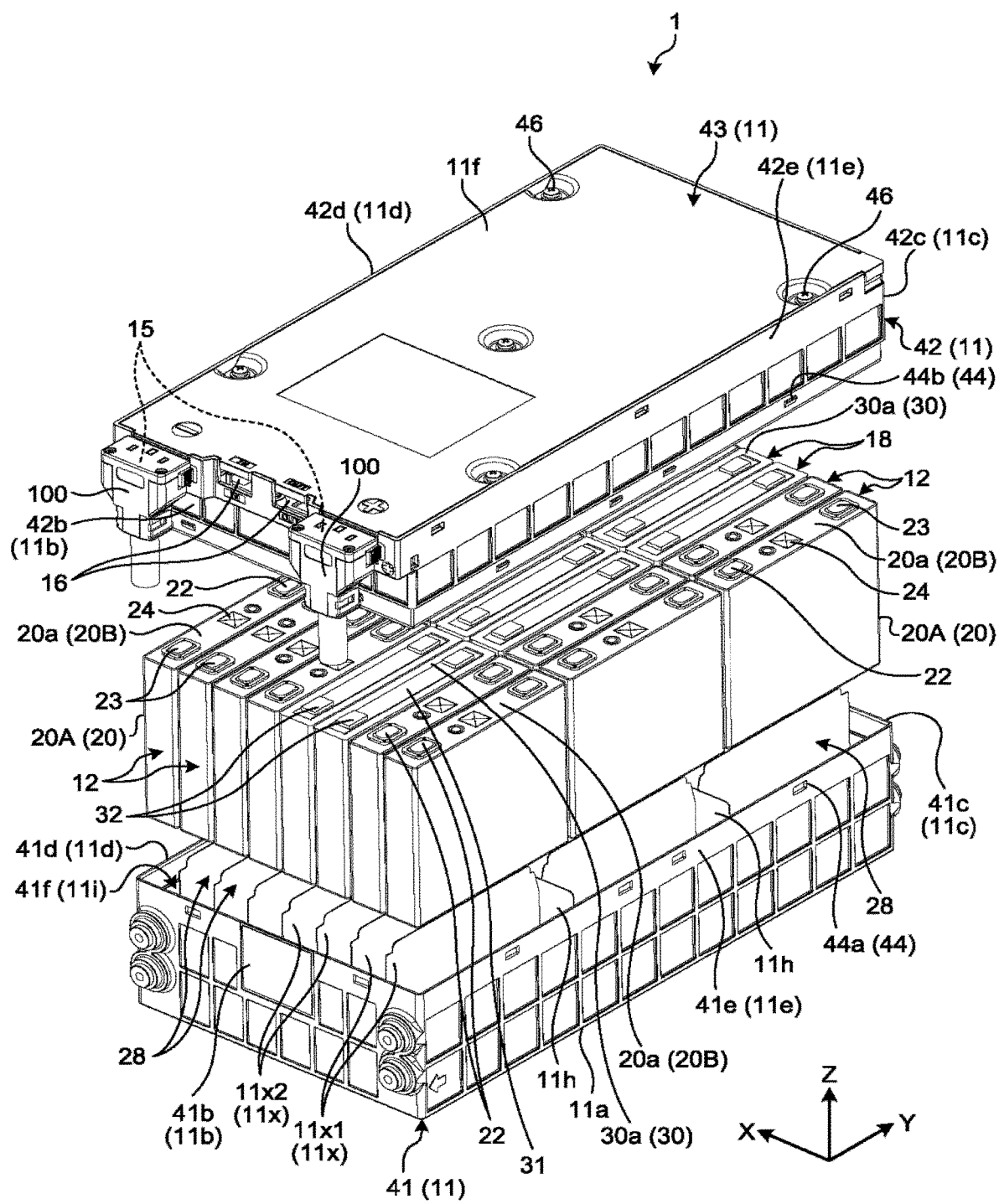
FIG. 2 is an exemplary and schematic exploded perspective view of the battery module in the first embodiment.
Figure 3:
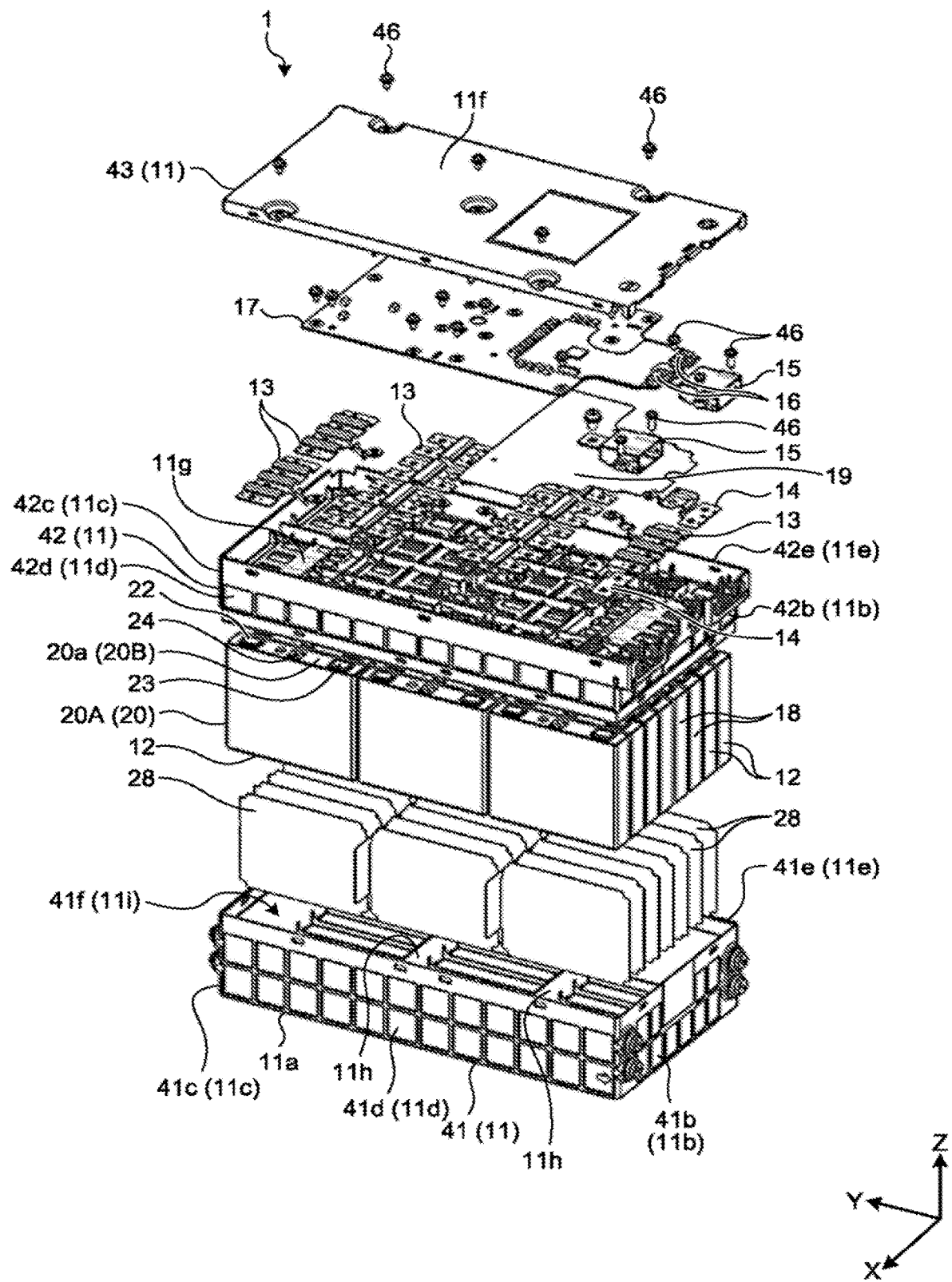
FIG. 3 is an exploded perspective view illustrating the battery module of FIG. 2 in detail.

FIG. 1 is a perspective view of a battery module 1. FIG. 2 is an exploded perspective view of the battery module 1. FIG. 3 is an exploded perspective view illustrating the battery module 1 of FIG. 2 in detail. As illustrated in FIGS. 1 to 3, the battery module 1 includes, for example, a chassis 11, a plurality of battery cells 12, bus bars 13, 14, connector's 15, 16, a circuit board 17, and connection members 18. The chassis 11 is one example of a first chassis, and the bus bars 13, 14 are an example of a conductive member.

The battery cells 12, the bus bars 13, 14, the connectors 15, 16, the circuit board 17, and the connection members 18 are housed in the chassis 11. The battery cells 12 are electrically connected to one another via the bus bars 13 and the connection members 18. The power of the battery cells 12, that is, the power of the battery module 1 can be output to external connectors 100 via the bus bars 14 and the connectors 15. One of the connectors 15 is a positive connector, and the other is a negative connector.

The battery module 1 is installed as a power supply in various devices, machinery, or facilities, for example. For example, the battery module 1 may be used as a mobile power supply for an automobile or a bicycle (mobile structure), and as a stationary power supply for a point-of-sale (POS) system. A set of battery modules 1 in the present embodiment can also be connected in series or in parallel for installation in various devices. The number and the arrangement of the connection members 18 or the battery cells 12 of the battery module 1 are not limited to those disclosed in the embodiment. The battery module 1 is also referred to as a battery pack or a battery device, for example, and the battery cells 12 are also referred to as cells or batteries.

The battery cells 12 are lithium-ion secondary batteries, for example. The battery cells 12 may also be other types of secondary batteries (storage batteries or rechargeable batteries) such as nickel metal hydride batteries, nickel cadmium batteries, or lead-acid batteries. The lithium-ion secondary batteries are nonaqueous electrolyte secondary batteries in which lithium ions in the electrolyte conduct electricity. Examples of the material of the positive electrode include lithium-manganese composite oxide, lithium-nickel composite oxide, lithium-cobalt composite oxide, lithium-nickel-cobalt composite oxide, lithium-manganese-cobalt composite oxide, spinel-type lithium-manganese-nickel composite oxide, and lithium phosphorus oxide having olivine structure. Examples of the material of the negative electrode include an oxide-based material such as lithium titanate (LTO) and an oxide material such as niobium composite oxide. The electrolyte (such as electrolytic solution) may be a sole or a mixture of organic solvents, such as ethylene carbonate, propylene carbonate, diethyl carbonate, ethyl methyl carbonate, or dimethyl carbonate mixed with lithium salt such as fluorine-based complex salt (e.g., LiPF4, LiPF6).

As illustrated in FIG. 2, the battery cells 12 each include, for example, a chassis 20, and a positive terminal 22 and a negative terminal 23 being electrodes. The chassis 20 has a thin flat cuboid shape in the X direction. The positive terminal and the negative terminal 23 are mounted on the top face 20a of the chassis 20. The top face 20a may also be referred to as a terminal face, a top, an outer face, or an exposed face. The chassis 20 is one example of a second chassis.

The chassis 20 includes, for example, a casing 20A and a lid 20B. The casing 20A has a cuboid box shape with an open end (top end). The lid 20B has a rectangular plate shape and closes the open end of the casing 20A. The casing 20A and the lid 20B are joined with each other by welding, for example, to prevent any liquid or gas from leaking through the joints. The chassis 20 is made of a metallic material such as aluminum, for example. The battery cells 12 are of rectangular type and may also be referred to as rectangular cells, for example.

The chassis 20 contains an electrode and electrolytic solution, for example. The electrode includes, for example, a positive-electrode sheet, a negative-electrode sheet, and an insulating layer (separator). The electrode may have a flat shape formed by winding the positive-electrode sheet, the negative-electrode sheet, and the insulating layer. The electrode includes a group of electrodes and functions as a power generating element.

The positive terminal 22 and the negative terminal 23 pass through the lid 20B in the Z direction. The positive terminal 22 and the negative terminal 23 are spaced apart from each other in the longitudinal direction of the lid 20B, that is, in the Y direction. The positive terminal 22 is electrically connected to the positive-electrode sheet of the electrode in the chassis 20, and the negative terminal 23 is electrically connected to the negative-electrode sheet of the electrode in the chassis 20.

A valve 24 is provided between the positive terminal 22 and the negative terminal 23 on the lid 20B. The valve 24 is opened to reduce the pressure in the chassis 20 when exceeding a threshold.

The battery cells 12 are arranged in three rows in the chassis 11, for example. Specifically, three rows of six battery cells 12 and two connection members 18 are aligned in the X direction and arranged in the Y direction in the chassis 11. The battery cells 12 and the connection members 18 are arranged such that top faces 20a, 30a (terminal faces) all face in the same direction (upwards), and that the long sides of the top faces 20a, 30a lie in the same direction (Y direction). The battery cells 12 and the connection members 18 are electrically connected serially or in parallel via the bus bars 13, 14 as illustrated in FIG. 3.

As illustrated in FIGS. 1 to 3, the chassis 11 has a long cuboid shape in the Y direction. The chassis 11 has a plurality of walls such as a bottom wall 11a, end walls 11b, 11c, side walls 11d, 11e, a top wall 11f, a middle wall 11g (see FIG. 3), and partitioning walls 11h (see FIGS. 2 and 3).

The bottom wall 11a extends in a direction orthogonal to the Z direction (along the XY plane) and has a long rectangular plate shape in the Y direction. The bottom wall 11a faces the bottom faces of the battery cells 12 and the bottom faces 30b of the connection member 18 (see FIG. 5).

The end walls 11b, 11c both extend in a direction orthogonal to the Y direction (along the XZ plane) and are spaced apart from each other in parallel in the Y direction. The end walls 11b, 11c are connected to both longitudinal, or Y-directional ends of the bottom wall 11a.

The side walls 11d, 11e both extend in a direction orthogonal to the X direction (the YZ plane) and are spaced apart from each other in parallel in the X direction. The side walls 11d, 11e are connected to both lateral, or X-directional ends of the bottom wall 11a. The side walls 11d, 11e are connected to the end walls 11b, 11c.

The top wall 11f has a rectangular plate shape extending along the bottom wall 11a. The top wall 11f is connected to the ends of the end walls 11b, 11c and of the side walls 11d, 11e opposite the bottom wall 11a.

The middle wall 11g (see FIG. 3) has a rectangular plate shape extending along the bottom wall 11a, as with the top wall 11f. The middle wall 11g is located between the bottom wall 11a and the top wall 11f with spacing in the Z direction. The middle wall 11g is connected to the inner faces of the end walls 11b, 11c and of the side walls 11d, 11e.

The partitioning walls 11h have a rectangular plate shape extending along the end walls 11b, 11c. The partitioning walls 11h are located between the bottom wall 11a and the middle wall 11g and extend across the side wall 11d and the side wall 11e. The partitioning walls 11h and the end walls 11b, 11c are aligned in the Y direction with spacing.

The chassis 11 contains a chamber 11i surrounded by the bottom wall 11a, the end walls 11b, 11c, the side walls 11d, 11e, and the middle wall 11g. The chamber 11i is partitioned into a plurality of compartments 11x (areas, spaces) by the partitioning walls 11h and spacers 28, and the battery cells 12 or the connection members 18 are housed one by one in the compartments 11x illustrated in FIGS. 2 and 3. In other words, the compartments 11x include first compartments 11x1 in which the battery cells 12 are housed, and second compartments 11x2 in which the connection members 18 are housed. In this embodiment, in each Y-directional row two second compartments 11x2 are located at the center in the X direction.

The chassis 11 is made of an insulating synthetic resin material such as modified-polyphenylene ether (PPE), or perfluoroalkoxy alkane (PFA) (tetrafluoroethylene perfluoroalkyl vinyl ether copolymer). The synthetic resin material of the chassis 11 may be thermoplastic resin. Examples of the thermoplastic resin include polyethylene (PE), olefin resins such as polypropylene (PP) and polymethylpentene (PMP), polyester-based resins such as polyethylene terephthalate (PET), polybutylene terephthalate (PBT), and polyethylene-naphthalate (PEN), polyoxymethylene (POM) resins, polyamide-based resins such as polyamide (PA) 6, PA66, PA12, crystalline resins such as polyphenylene sulfide (PPS) resins and liquid-crystal polymer (LCP) resins, polymer alloys thereof, and non-crystalline resins such as polystyrene (PS), polycarbonate (PC), polycarbonate/acrylonitrile butadiene styrene (PC/ABS), ABS, AS, modified PPE, polyethersulfone (PES), polyetherimide (PEI), and polysulfone (PSF), and polymer alloys thereof.

The chassis 11 is formed as an assembly of different parts (divided parts). Specifically, the chassis 11 includes, for example, a casing 41, a middle cover 42, and a top cover 43. The middle cover 42 closes the chamber 11i of the casing 41 and is integrated with the casing 41. The top cover 43 closes a part of the middle cover 42 where the bus bars 13, 14 and the circuit board 17 are housed, and is integrated with the middle cover 42.

The casing 41 includes the bottom wall 11a, end walls 41b, 41c of the end walls 11b, 11c, side walls 41d, 41e of the side walls 11d, 11e, and the partitioning walls 11h. The casing 41 is provided with an opening 41f opened upward and surrounded by the bottom wall 11a, the end walls 41b, 41c, and the side walls 41d, 41e. The opening 41f forms at least part of the chamber 11i. The casing 41 may also be referred to as a housing or a first chassis member, for example.

The middle cover 42 includes end walls 42b, 42c of the end walls 11b, 11c, side walls 42d, 42e of the side walls 11d, 11e, and the middle wall 11g. The middle cover 42 covers the opening 41f of the casing 41. The middle wall 11g is connected to the middle points of the end walls 42b, 42c and of the side walls 42d, 42e in the Z direction. The middle cover 42 may also be referred to as a middle member or a second chassis member.

The top cover 43 includes at least the top wall 11f. The top cover 43 covers the space above the middle wall 11g of the middle cover 42. The top cover 43 may also be referred to as a lid or a third chassis member, for example.

As illustrated in FIGS. 1 and 2, the casing 41 and the middle cover 42 are mechanically coupled to each other with hooks 44, and the middle cover 42 and the top cover 43 are mechanically coupled to each other with hooks 45. In other words, the casing 41 and the top cover 43 are joined together via the middle cover 42.

The hooks 44 include, for example, a plurality of openings 44a (see FIG. 2) in the end walls 41b, 41c and the side walls 41d, 41e of the casing 41, and a plurality of tabs 44b on the middle cover 42. The tabs 44b are hooked by the edges of the openings 44a. As with the hooks 44, the hooks 45 include a plurality of openings in the side walls 42d, 42e of the middle cover 42 and a plurality of tabs on the top cover 43, and the tabs are hooked by the edges of the openings, for example.

In the above-configured chassis 11 the battery cells 12 and the connection members 18 are housed in the opening 41f of the casing 41 being part of the chamber 11i, as described above. The insulating spacers 28 are placed between the adjacent battery cells 12, between the adjacent connection members 18, and between the battery cell 12 and the connection member 18 in the X direction. The spacers 28 separate every two adjacent members in the X direction. The spacers 28 are plates or sheets made of an insulating material, for example, and are detachable from the chassis 11. The spacers 28 may also be referred to as partitioning walls (walls), for example.

The positive terminals 22 and the negative terminals 23 of the battery cells 12 and the pairs of connection terminals 32 of the connection members 18 protrude toward the top wall 11f through through-holes (openings, not illustrated) in the middle wall 11g (see FIG. 3).

The bus bars 13, 14, the connectors 15, 16, the circuit board 17, and a plate member 19 are housed in the space between the middle wall 11g and the top wall 11f. The bus bars 13, 14 are joined with the positive terminals 22 and the negative terminals 23 of the battery cells 12 and with the pairs of connection terminals 32 of the connection member 18 by welding, for example. The connectors 15 are joined with the middle cover 42 with fasteners 46 such as screws, and the circuit board 17 is joined with the top cover 43 with fasteners 46 such as screws.

The circuit board 17 is a print circuit board (PCB), for example. The circuit board 17 is provided with wiring patterns on which electronic components are mounted. The circuit board 17 is electrically connected to the bus bars 13 to detect the temperatures of the bus bars 13 and the voltages of the battery cells 12, for example.

Two connectors 16 are mounted on the circuit board 17. One example of these connectors 16 is LAN connectors (communication connectors). The connectors 16 and the connectors 15 are exposed from the openings in the end wall 42b of the middle cover 42. The connectors 16 are located between the two connectors 15. The connectors 16 are connected to connectors of LAN cables, for example. A controller receives results of the detection from the circuit board 17 and controls the voltages of the battery cells 12 via the connectors of the LAN cables, for example.

Figure 4:
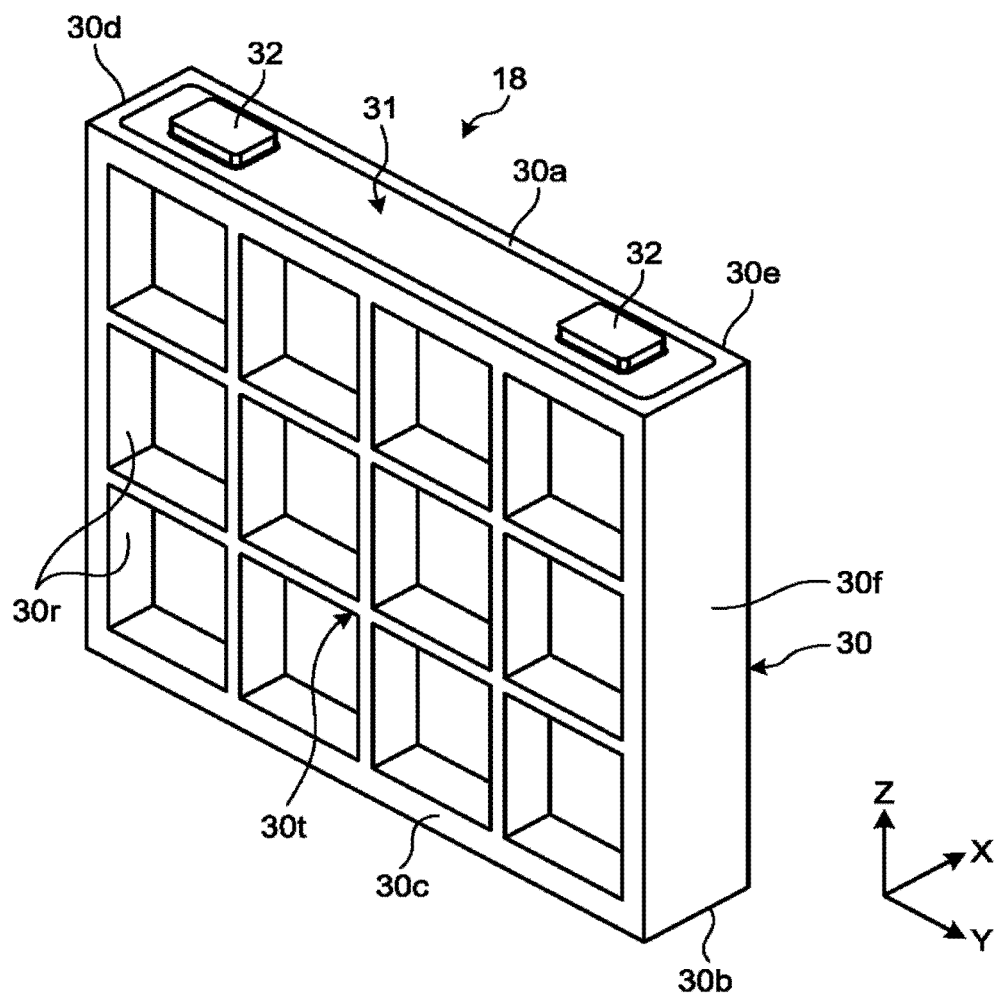
FIG. 4 is an exemplary and schematic perspective view of a connection member in the battery module in the first embodiment.
Figure 5:
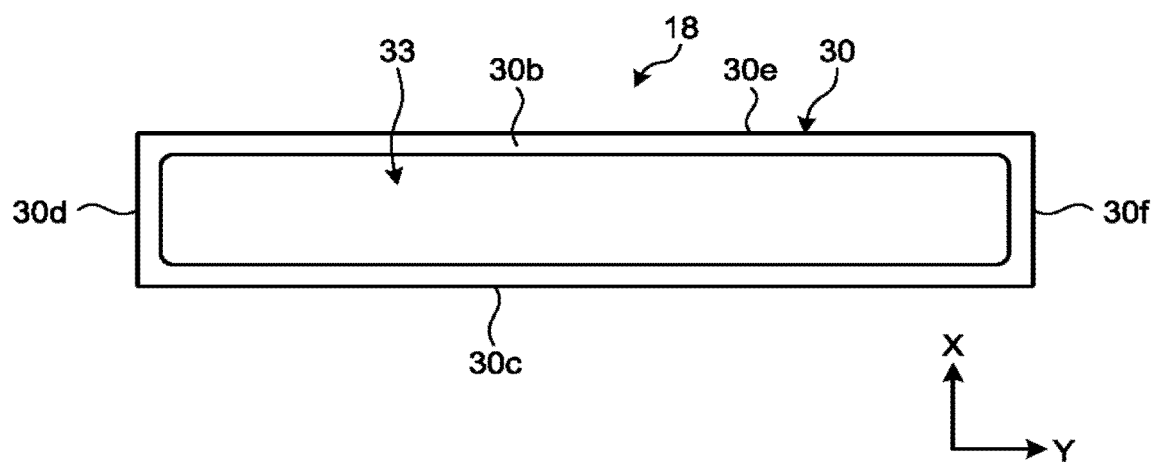
FIG. 5 is an exemplary and schematic plan view of a second plate of the connection member in the battery module in the first embodiment.

FIG. 4 is a perspective view of the connection member 18. FIG. 5 is a plan view of a second plate 33 of the connection member 18. As illustrated in FIGS. 4 and 5, the connection member 18 includes, for example, a body 30, a first plate 31, a pair of connection terminals 32, and a second plate 33. The pair of connection terminals 32 and the first plate 31 are placed on the top face 30a of the body 30. The first plate 31 is made of a metallic material such as aluminum or copper and is electrically connected to the pair of connection terminals 32. The first plate 31 is one example of a conductor, and the top face 30a is one example of a first face.

The connection member 18 is a structure of substantially the same shape as the battery cell 12. However, the connection member 18 lacks an electrode serving as a power generating element. As illustrated in FIG. 2, in the battery module 1 of the present embodiment such connection members 18 are housed in the second compartments 11x2 in replace of part of the battery cells 12. Thereby, multiple battery modules 1 with different voltages and specifications can share parts and elements including the chassis 11 and the bus bars 13, 14. According to the first embodiment, for example, the time, labor, and costs required for manufacturing the battery module 1 can be thus reduced, compared with those for the battery modules 1 including chassis 11 and bus bars 13, 14 having different specifications depending on the rated voltage. The connection members 18 may also be referred to as cell bus bars or dummy batteries, for example.

The body 30 has a thin flat cuboid shape in the X direction, for example. The body 30 housed in the second compartment 11x2 functions as a reinforcing member for the battery cell 12 instead of the chassis 20. The body 30 is made of an insulating synthetic resin material such as polycarbonate. The body 30 is not limited to this example, and may be made of a metallic material such as aluminum, for example. The body 30 may also be referred to as a base, a casing, a chassis, or a container, for example.

The first plate 31 has a rectangular plate shape extending along the top face 30a of the body 30. The first plate 31 is exposed to the top face 30a. In other words, the first plate 31 forms at least a part of the top face 30a. The first plate 31 is integrated with the body 30 by insert molding, for example. The top face 30a faces the middle wall 11g (see FIG. 3) while the body 30 is housed in the second compartment 11x2. The top face 30a may also be referred to as a terminal face or an upper face, for example.

The pair of connection terminals 32 are mounted on the first plate 31. The pair of connection terminals 32 are spaced apart from each other in the longitudinal direction of the first plate 31, that is, in the Y direction. In other words, the first plate 31 extends across the pair of connection terminals 32. The pair of connection terminals 32 are joined with the first plate 31 by welding, for example. The pair of connection terminals 32 is not limited to this example, and may be protrusions integrated with the first plate 31, for example.

As illustrated in FIG. 5, the second plate 33 has a rectangular plate shape extending along the bottom face 30b of the body 30. The second plate 33 is exposed to the bottom face 30b. In other words, the second plate 33 forms at least a part of the bottom face 30b. The second plate 33 is integrated with the body 30 by insert molding, for example. The bottom face 30b faces the bottom wall 11a while the body 30 is housed in the second compartment 11x2. The bottom face 30b is one example of a second face and may also be referred to as a lower face, for example.

The second plate 33 and the first plate 31 described above are made of a metallic material such as aluminum, that is, the same material as the chassis 20 of the battery cell 12. Thereby, in this embodiment, both the chassis 20 and the body 30 can be fixed to (integrated with) the bottom wall 11a and the middle wall 11g using the same adhesive. According to the embodiment, thus, for example, compared with the second plate 33 and the first plate 31 made of a different material from the chassis 20, it is possible to prevent the adhesive bonding between the chassis 20 and the chassis 11 from lowering from the adhesive bonding between the body 30 and the chassis 11, and to reduce the time and labor required for manufacturing (assembling) the battery module 1. The second plate 33 and the first plate 31 are not limited this example, and may be made of a different material from the chassis 20.

As illustrated in FIG. 4, side faces 30c, 30e of the body 30 are provided with a plurality of openings 30r. The openings 30r have a quadrangular shape in X-directional view. The openings 30r are recesses (grooves) that open to the side face 30c, 30e, for example. The openings 30r are not limited to this example and may also be through-holes penetrating the side face 30c and the side face 30e. The openings 30r may also be referred to as hollows or thinned-down parts, for example. In other words, the openings 30r serve to reduce the weight of the body 30.

The side faces 30c, 30e are provided with lattices 30t of the openings 30r. In this embodiment, such lattices 30t ensure required stiffness and strength of the body 30. The side faces 30c, 30e face the spacers 28 while the body 30 is housed in the second compartment 11x2. The side faces 30d, 30f face the partitioning wall 11h or the end wall 11b, 11c while the body 30 is housed in the second compartment 11x2. The side faces 30c, 30e may also be referred to as long-side faces, for example, and the side faces 30d, 30f may also be referred to as short-side faces, for example.

As described above, in this embodiment, for example, the battery module 1 includes the chassis 11 and the connection members 18. The chassis 11 is provided with the first compartments 11x1 in which the battery cells 12 are housed one by one, and at least one second compartment 11x2 partitioned from the first compartments 11x1 in the X direction. The connection members 18 each include the body 30 housed in the second compartment 11x2, the pair of connection terminals 32 mounted on the top face 30a of the body 30 and electrically connectable to the positive terminal 22 and the negative terminal 23 of the battery cell 12 via the bus bars 13, and the first plate 31 (conductor) that extends across the pair of connection terminals 32. With such a configuration, for example, the spacers 28 partitioning the chassis 11 in the X direction and the bodies 30 of the connection members 18 housed in the second compartments 11x2 contribute to eliminating a hollow space in the chassis 11 and enhancing the stiffness and the strength of the battery module 1. Furthermore, owing to the above configuration, easier, more smooth, or quicker assembly work and wiring work for the battery cells 12 and the connection members 18 to the chassis 11 are feasible, for example.

In this embodiment, for example, the second compartments 11x2 are provided nearer to the center than to the end (the side walls 11d, 11e) of the chassis 11 in the X direction. Thereby, for example, the second compartments 11x2 enable the connection members 18 to be placed nearer not to the ends but to the center of the chassis 11 in the X direction, about which the battery cells 12 are likely to have higher temperatures. This can reduce location-dependent temperature variations in the battery cells 12 and elongate the longevity of the battery module 1, for example.

In this embodiment, for example, the conductor includes the first plate 31 extending along the top face 30a of the body 30. With such a configuration, for example, the conductor and the connection member 18 can be formed of the first plate 31 relatively easily. This leads to reducing required time, labor, and costs for manufacturing the connection members 18, for example.

In this embodiment, for example, the connection members 18 each include the second plate 33 exposed to the bottom face 30b of the body 30. With such a configuration, for example, heat conductivity between the body 30 and the bottom wall 11*a* may be improved by appropriately setting the specifications of the second plate 33.

In this embodiment, for example, the second plate 33 and the first plate 31 are made of the same material as the chassis 20 of the battery cell 12. Owing to the second plate 33 and the first plate 31 as configured above, for example, the bottom face 30*b* and the top face 30*a* of the body 30 and the bottom face and the top face of the battery cell 12 can be fixed to the chassis 11 with the same adhesive. This can, for example, prevent the adhesive bonding between the body 30 and the chassis 11 from lowering from the adhesive bonding between the battery cells 12 and the chassis 11, and reduce required time and labor for manufacturing (assembling) the battery module 1, compared with the second plate 33 and the first plate 31 made of a different material from that of the chassis 20.

In this embodiment, for example, the body 30 is provided with the lattice 30*t* of the openings 30*r* that open in the X direction. With such a configuration, for example, the body 30 (connection member 18) can be reduced in weight by the lattice 30*t* while maintaining required stiffness and strength.

Second Embodiment

Figure 6:
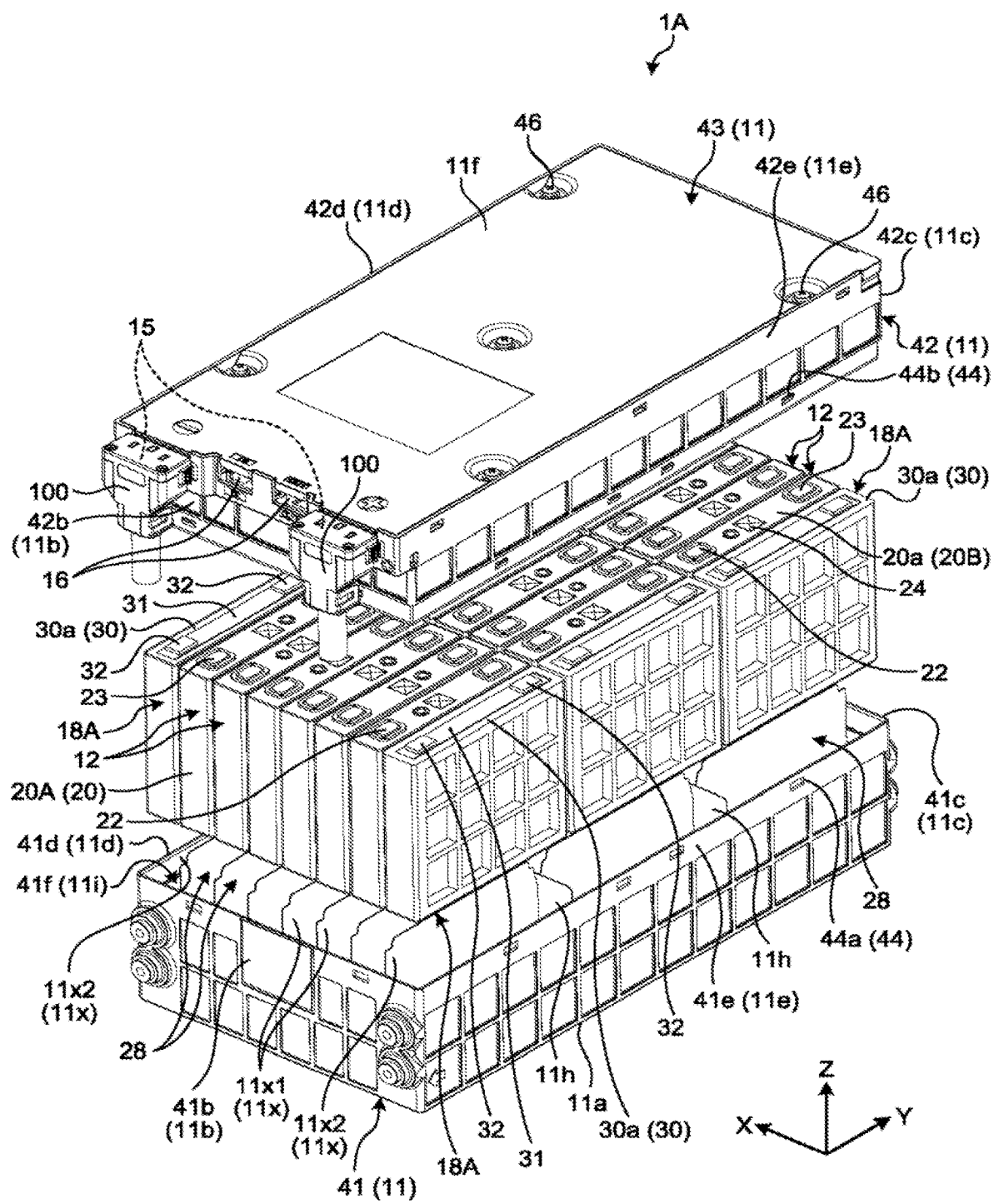
FIG. 6 is an exemplary and schematic exploded perspective view of a battery module according to a second embodiment.

A battery module 1A according to a second embodiment illustrated in FIG. 6 is configured similarly to the battery module 1 in the first embodiment. Thus, the second embodiment can attain similar results (effects) based on the similar configuration as with the first embodiment.

The second embodiment is, however, different from the first embodiment in that, for example, the second compartments 11*x*2 are provided on both X-directional ends of the chassis 11, as illustrated in FIG. 6. In this embodiment, in each row in the Y direction, the second compartments 11*x*2 are located at both X-directional ends. Because of this, for example, connection members 18A can be placed in the second compartments 11*x*2 at the X-directional ends of the chassis 11, to protect the battery cells 12. For example, when the chassis 11 receives vibrations or impact in the X direction, the bodies 30 of the connection members 18A can serve as a buffer. Thereby, it is possible to avoid transferring vibrations or impact to the battery cells 12. If the chassis 11 is placed beside a heat-generating element in the X direction, for example, the bodies 30 of the connection members 18A can serve as an insulator. Thereby, heat transfer from the heat-generating element to the battery cells 12 can be reduced. The connection members 18A at the X-directional ends contribute to downsizing, in the X direction, the circuit board 17 which monitors the temperatures or the voltages of the battery cells 12.

In this embodiment, the connection member 18A adjacent to one of the pair of connectors 15 is electrically connected to the adjacent connector 15 via the bus bar 14 (see FIG. 3), and the connection member 18A adjacent to the other connector 15 is electrically connected to the other connector 15 via the bus bar 14. In other words, the connection members 18A are disposed at the end of a series circuit that is electrically connected to the battery cells 12 via the bus bars 13 (see FIG. 3). With such a configuration, for example, compared with the connection members 18A placed in the middle of the series circuit, the circuit board 17 can be reduced in size, and the battery module 1A can be less affected by the connection members 18A.

Third Embodiment

Figure 7:
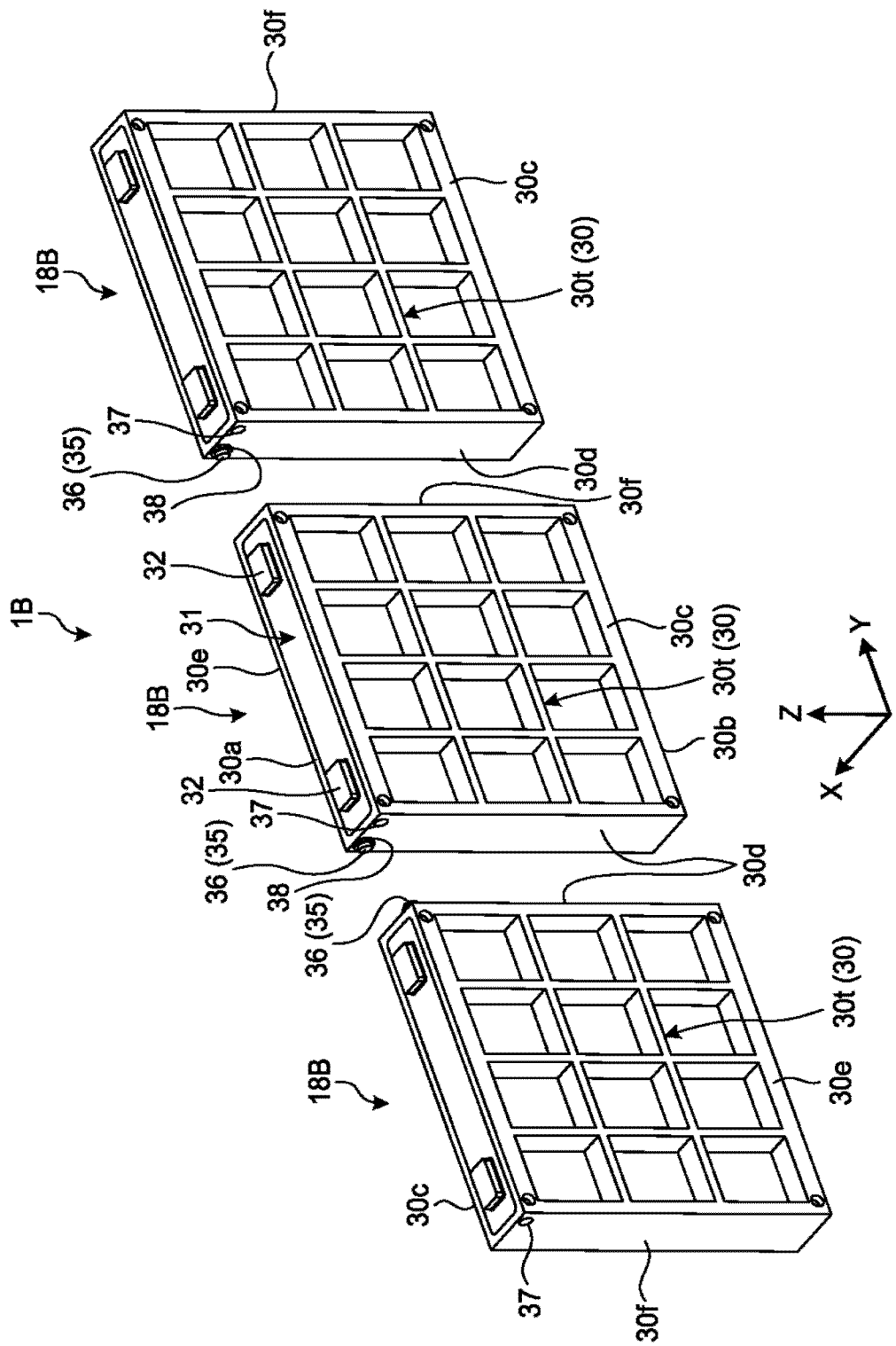
FIG. 7 is an exemplary and schematic perspective view of part of a battery module according to a third embodiment, while connection members are separated from one another.
Figure 8:
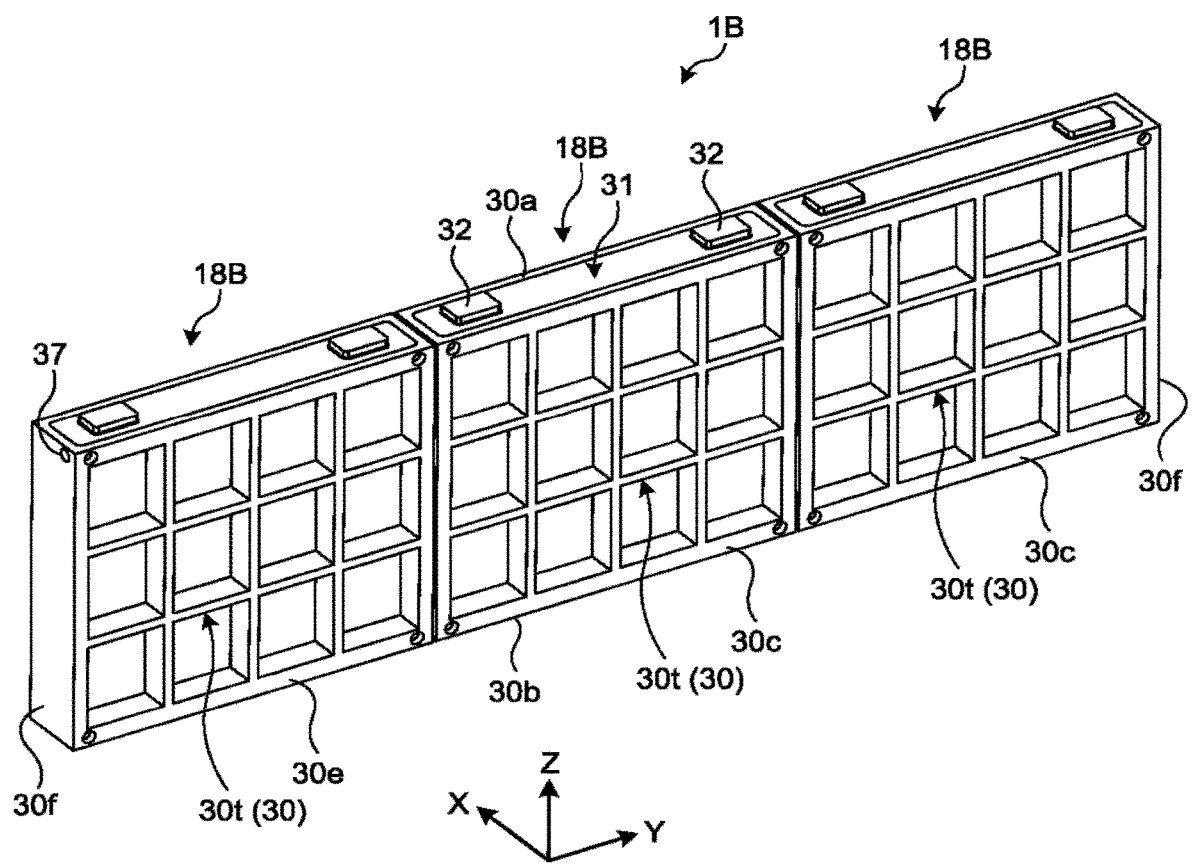
FIG. 8 is an exemplary and schematic perspective view of part of the battery module in the third embodiment, while the connection members are mechanically connected to one another.

A battery module 1B including connection members 18B according to a third embodiment illustrated in FIGS. 7 and 8 is configured similarly to the battery module 1 according to the first embodiment. Thus, the third embodiment can attain similar results (effects) based on the similar configuration as with the first embodiment.

The third embodiment is, however, different from the first embodiment in that a plurality of connection members 18B includes connects 35 to be mechanically connectable to one another, for example, as illustrated in FIG. 7. In this embodiment, the connects 35 are disposed on Z-directional end (top end) of the side faces 30*d*, 30*f* (short-side faces) of the bodies 30. The connects 35 are not limited to this example and may be provided on the side faces 30*c*, 30*e* of the bodies 30, for example. The connects 35 are one example of a first connect.

The connects 35 each include, for example, a protrusion 36 on the side face 30*d*, and a recess 37 in the side face 30*f* or the side face 30*d*. The recess 37 is connectable to the protrusion 36 of the adjacent connection member 18B in the Y direction. As illustrated in FIG. 8, the connection members 18B are integrated in the Y direction with the protrusions 36 fitted into the recesses 37 by press-fitting. The leftmost connection member 18B in FIG. 8 is in reverse posture relative to the other connection members 18B in the X direction.

As illustrated in FIG. 7, each protrusion 36 includes, at the base, a flange 38 that is radially (XZ plane) more expanded than the tip. The flange 38 is not containable in the recess 37. When the tip of the protrusion 36 is inserted into the recess 37, the flange 38 abuts against the recess 37, creating a gap corresponding to the height (thickness) of the flange 38 between two adjacent connection members 18B. The gap is set substantially equal to the thickness of the partitioning walls 11*h* (see FIG. 2) in the Y direction. Alternatively, the partitioning walls 11*h* may be provided with cut-out holes (openings) in which the protrusions 36 can be accommodated, for example.

Figure 9:
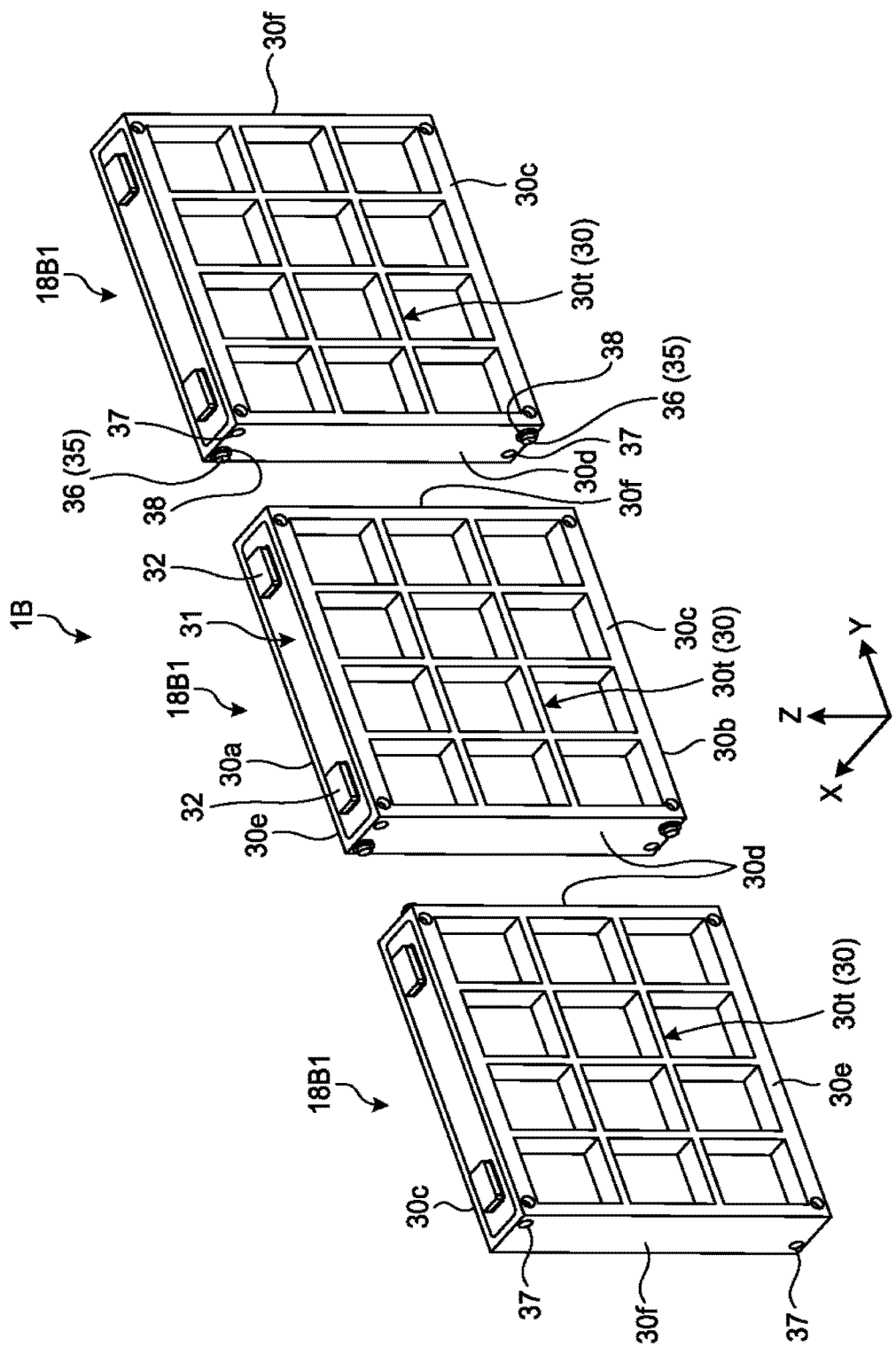
FIG. 9 is an exemplary and schematic perspective view of part of a battery module according to a modification of the third embodiment, while connection members are separated from one another.

As described above, in this embodiment, for example, the connection members 18B include the connects 35 to be mechanically connectable to one another. With such a configuration, for example, the connection members 18B can be integrated with the connects 35, which can facilitate assembly work for the connection members 18B to the chassis 11, and enhance the stiffness and the strength of the connection members 18B and of the battery module 1B. The third embodiment describes the example in which the connects 35 are placed at one Z-directional end of the side faces 30*d*, 30*f*; however, it is not limited to such an example. The connects 35 may be disposed on both Z-direction ends of the side faces 30*d*, 30*f* of connection members 18B1 according to one modification, as illustrated in FIG. 9, for example.

Fourth Embodiment

Figure 10:
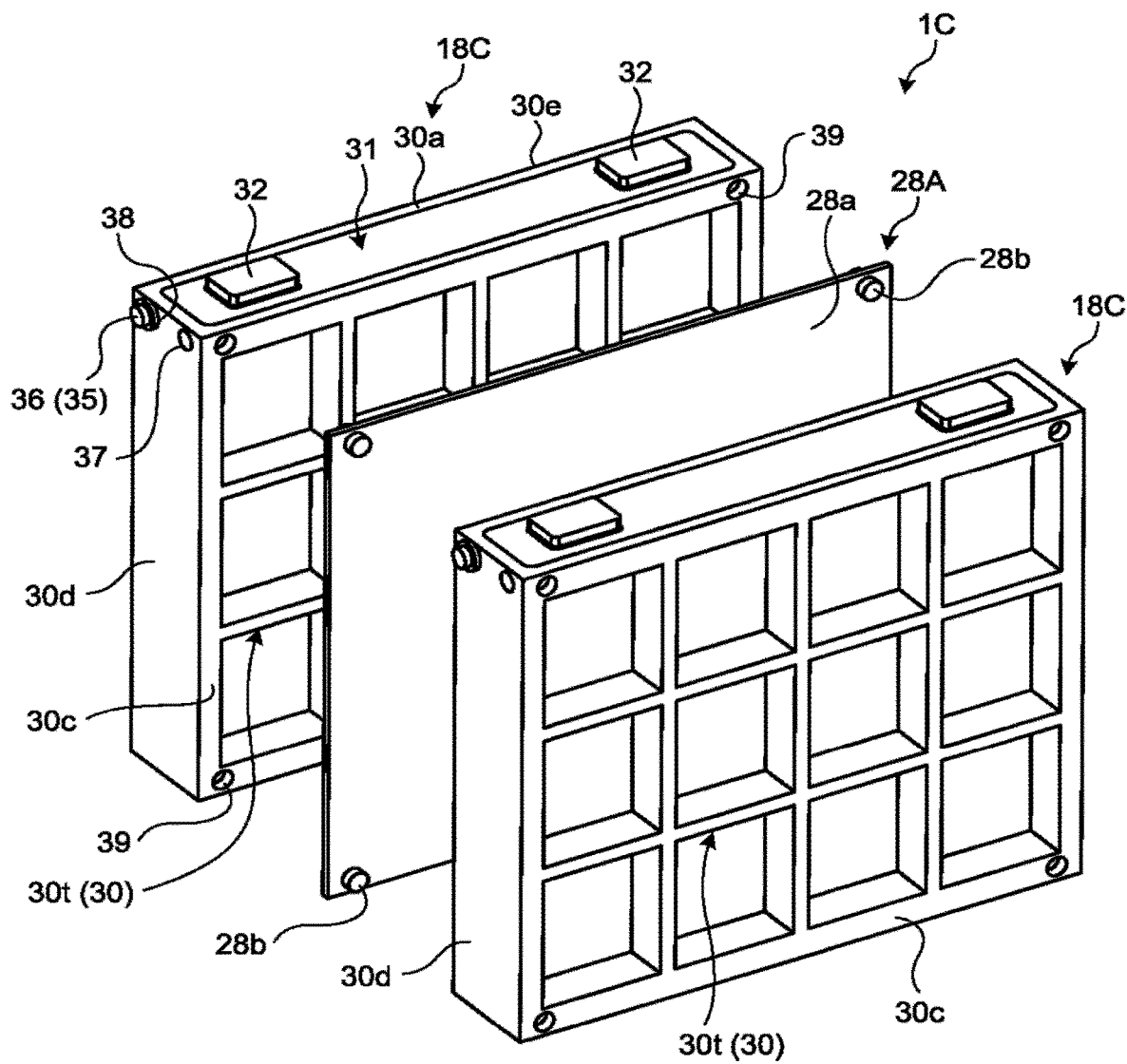
FIG. 10 is an exemplary and schematic perspective view of part of a battery module according to a fourth embodiment, while connection members are separated from one another.
Figure 11:
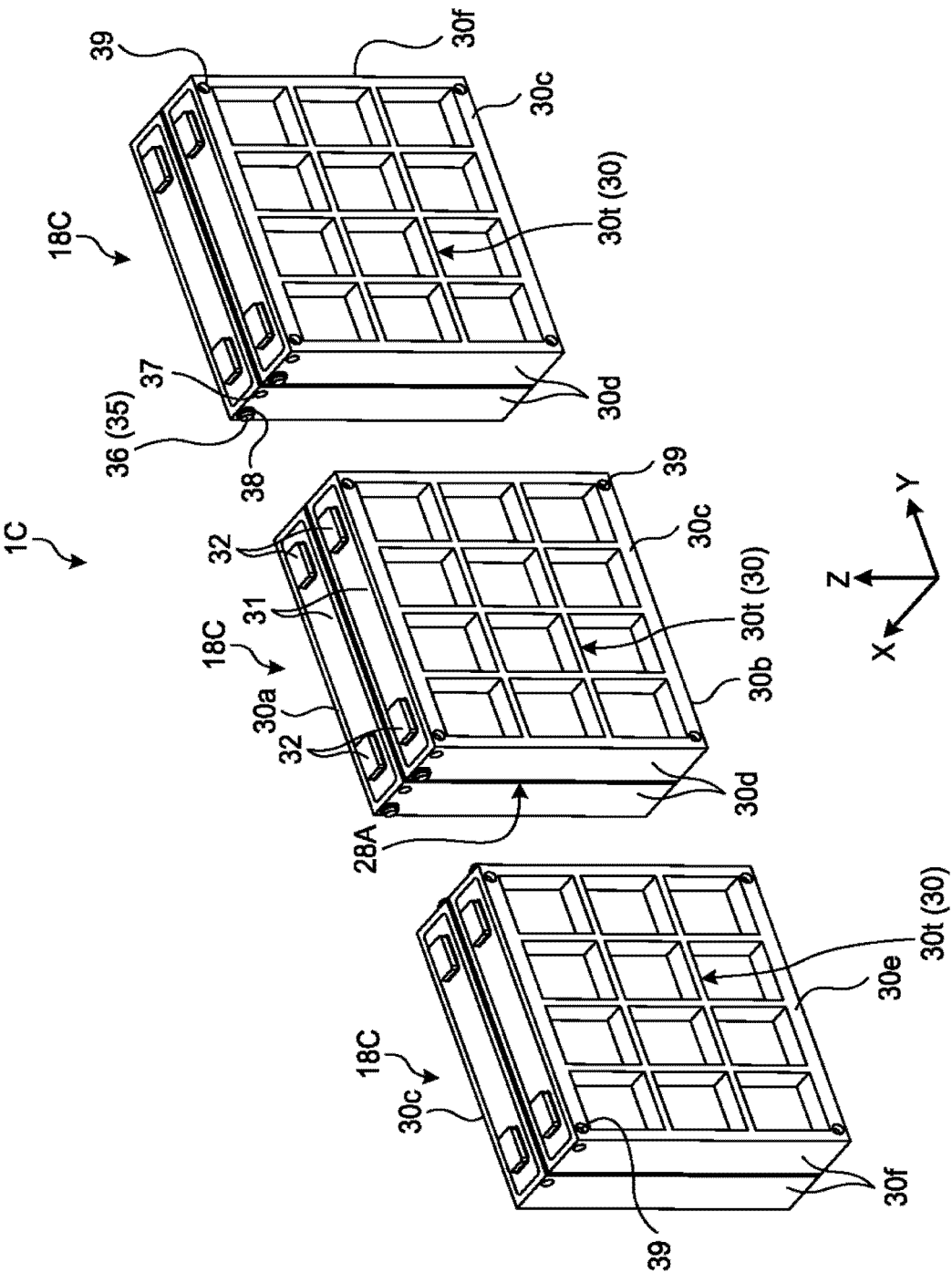
FIG. 11 is an exemplary and schematic perspective view of part of a battery module in the fourth embodiment, while subassemblies of the connection members are separated from one another.
Figure 12:
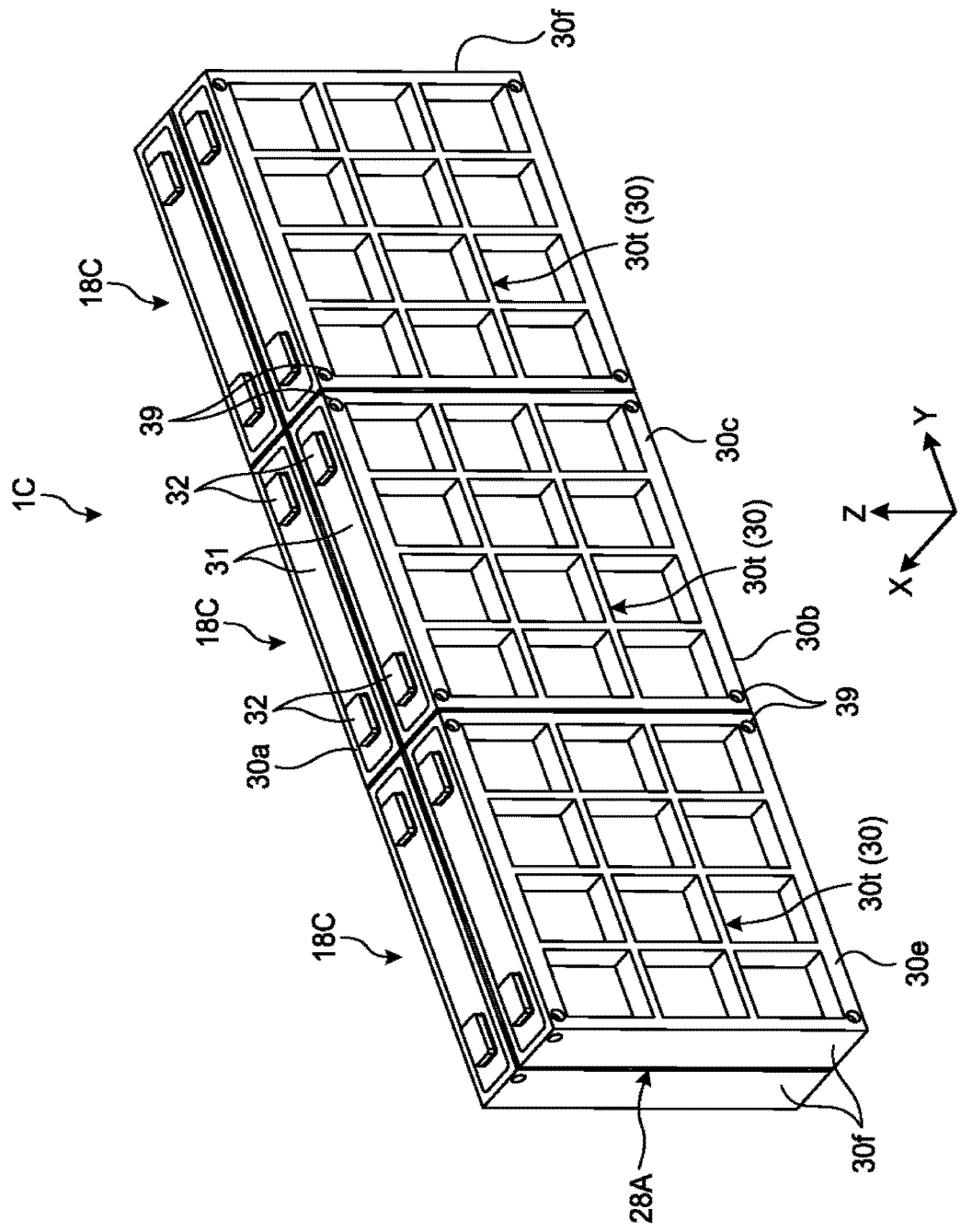
FIG. 12 is an exemplary and schematic perspective view of part of the battery module in the fourth embodiment, while the subassemblies of the connection members are mechanically connected to one another.

A battery module 1C including connection members 18C according to a fourth embodiment illustrated in FIGS. 10 to 12 is configured similarly to the battery module 1 in the first embodiment. Thus, the fourth embodiment can attain similar results (effects) based on the similar configuration, as with the first embodiment.

The fourth embodiment is, however, different from the first embodiment in that a plurality of connection members 18C are mechanically connected to one another via spacers 28A, as illustrated in FIGS. 10 and 11, for example. The spacers 28A each include, for example, a plate 28*a* and protrusions 28*b*. The plate 28*a* has a quadrangular shape extending in a direction orthogonal to the X direction (along the YZ plane). The plate 28*a* has substantially the same size as the side faces 30c, 30e of the connection members 18C. The plate 28a is interposed between the two adjacent connection members 18C in the X direction. In other words, the plate 28a serves as a partition between the two adjacent second compartments 11x2 in the X direction (see FIG. 2).

The protrusions 28b are placed at the four corners of the plate 28a, for example. The protrusions 28b protrude from both sides of the plate 28a in the X direction. In other words, the plate 28a is provided with eight protrusions 28b. Four of the protrusions 28b on one side are mechanically connectable to the connection member 18C located on the same side, and the other four of the protrusions 28b on the opposite side are be mechanically connectable to the connection member 18C located on the opposite side. The spacers 28A are made of a synthetic resin material or a metallic material, for example.

The side faces 30c, 30e of the connection members 18C are provided with recesses 39 at positions corresponding to the positions of the protrusions 28b. In this embodiment, for example, two connection members 18C and the spacer 28A are integrated in the X direction by fitting the protrusions 28b into the recesses 39 by press-fitting. As illustrated in FIGS. 11 and 12, subassemblies of the connection members 18C are integrated in the Y direction by fitting the protrusions 36 into the recesses 37 by press-fitting. The leftmost subassemblies in the FIGS. 11 and 12 are in reverse posture relative to the other subassemblies in the X direction. The protrusions 28b and the recesses 39 are one example of a second connect.

As described above, in this embodiment, for example, the connection members 18C are mechanically connectable to each other via the spacers 28A. Because of this, for example, the connection members 18C can be integrated with the spacers 28A for partitioning between the second compartments 11x2 (see FIG. 2). This can, for example, further reduce required time and labor for manufacturing (assembling) the battery module 1C, and improve the stiffness and the strength of the battery module 1C.

Fifth Embodiment

Figure 13:
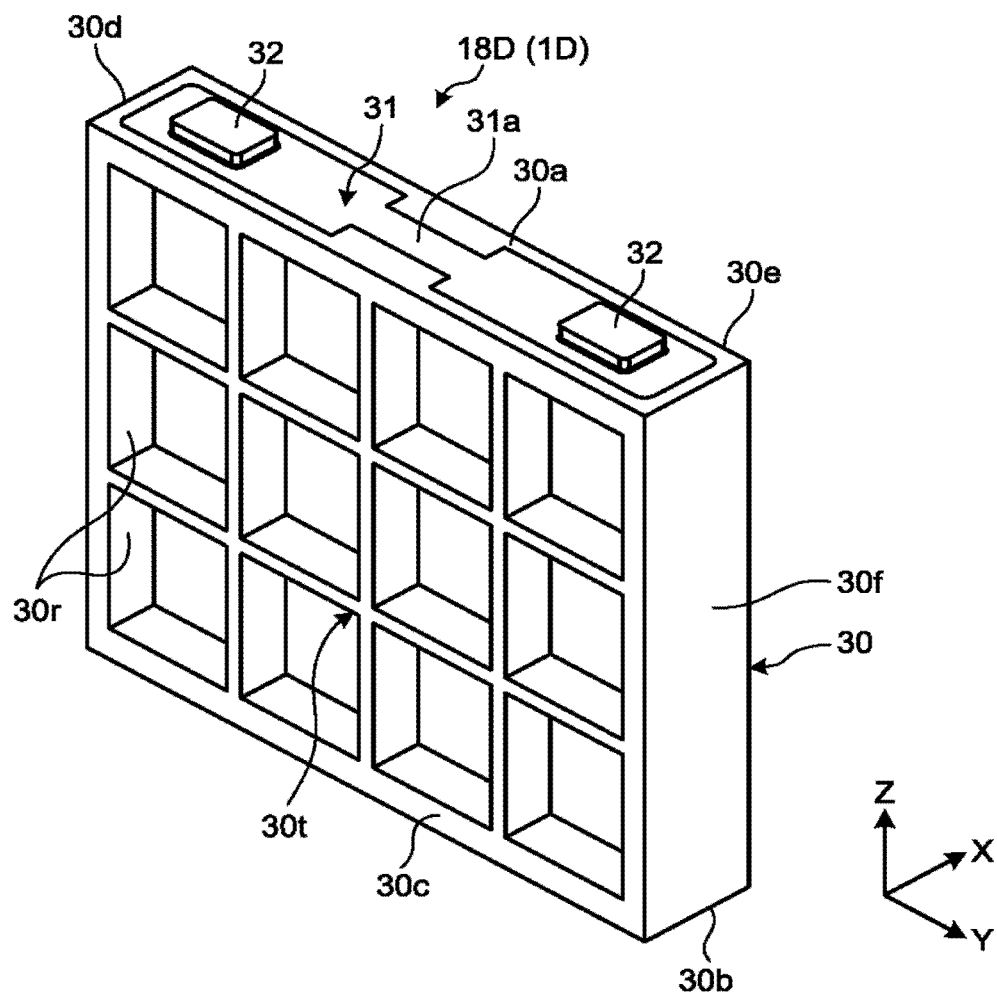
FIG. 13 is an exemplary and schematic perspective view of a connection member of a battery module according to a fifth embodiment.

A battery module 1D including connection members 18D according to a fifth embodiment illustrated in FIG. 13 is configured similarly to the battery module 1 in the first embodiment. Thus, the fifth embodiment can also attain similar results (effects) based on the similar configuration, as with the first embodiment.

The fifth embodiment is, however, different from the first embodiment in that the first plate 31 of a connection member 18D includes a smaller-width part 31a, as illustrated in FIG. 13, for example. The smaller-width part 31a of the first plate 31 is located between the pair of connection terminals 32. The smaller-width part 31a is smaller in width than a part of the first plate 31 connected to the pair of connection terminals 32 in the X direction. In this embodiment, the smaller-width part 31a is configured to fuse when a large current of a certain level or higher flows through the first plate 31. The smaller-width part 31a is one example of a fuse. The smaller-width part 31a may also be referred to as a fragile part or a fusible part, for example. According to the fifth embodiment, the connection member 18D including the first plate 31 with the smaller-width part 31a can have a fuse function, for example. The fifth embodiment describes the example of the first plate including the smaller-width part 31a, but is not limited thereto. The fuse may be interposed between the first plates 31, for example.

Sixth Embodiment

Figure 14:
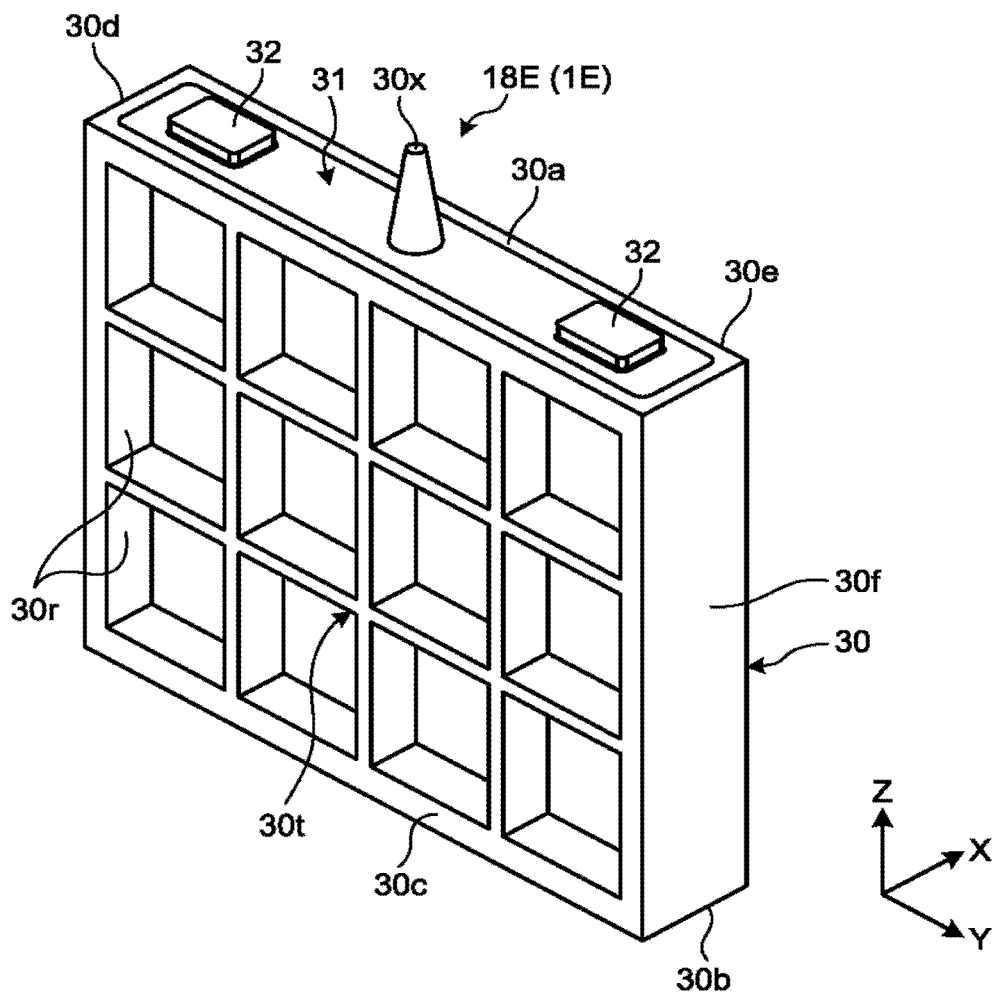
FIG. 14 is an exemplary and schematic perspective view of a connection member of a battery module according to a sixth embodiment.
Figure 15:
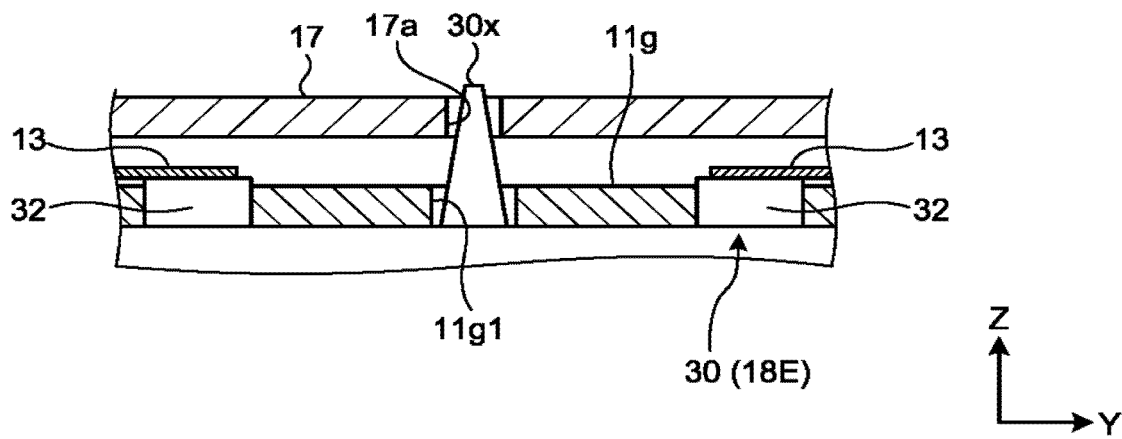
FIG. 15 is an exemplary and schematic sectional view of part of the battery module in the sixth embodiment.

A battery module 1E including connection members 18E according to a sixth embodiment illustrated in FIGS. 14 and 15 is configured similarly to the battery module 1 in the first embodiment. Thus, the sixth embodiment can attain similar results (effects) based on the similar configuration, as with the first embodiment.

The sixth embodiment is, however, different from the first embodiment in that the connection member 18E includes a projection 30x on the top face 30a, as illustrated in FIGS. 14 and 15, for example. The projection 30x is located about the center of the top face 30a (the first plate 31), and projects in the Z direction (upward). The projection 30x is one example of a mark and can serve as an identifier of the connection member 18E from the battery cells 12.

As illustrated in FIG. 15, the middle wall 11g and the circuit board 17 of the chassis 11 are provided with openings 11g1, 17a, respectively, at locations corresponding to the projection 30x. In this embodiment, for example, the location of the connection member 18E can be recognized by the projection 30x inserted into the openings 11g1, 17a even when the connection member 18E is covered by the middle wall 11g or the circuit board 17. This enables easier, more smooth, or quicker wiring work for the battery module 1E according to the sixth embodiment, for example. Furthermore, the connection member 18E can be advantageously prevented from being erroneously assembled at the location of the battery cell 12 (first compartment 11x1) since if that occurs, the projection 30x interferes with the middle wall 11g or the circuit board 17, for example.

Seventh Embodiment

A battery module 1F including connection members 18F according to a seventh embodiment is partly different in configuration from the battery module 1 in the first embodiment. The seventh embodiment can attain similar results (effects) based on the similar configuration, as with the first embodiment.

Figure 16:
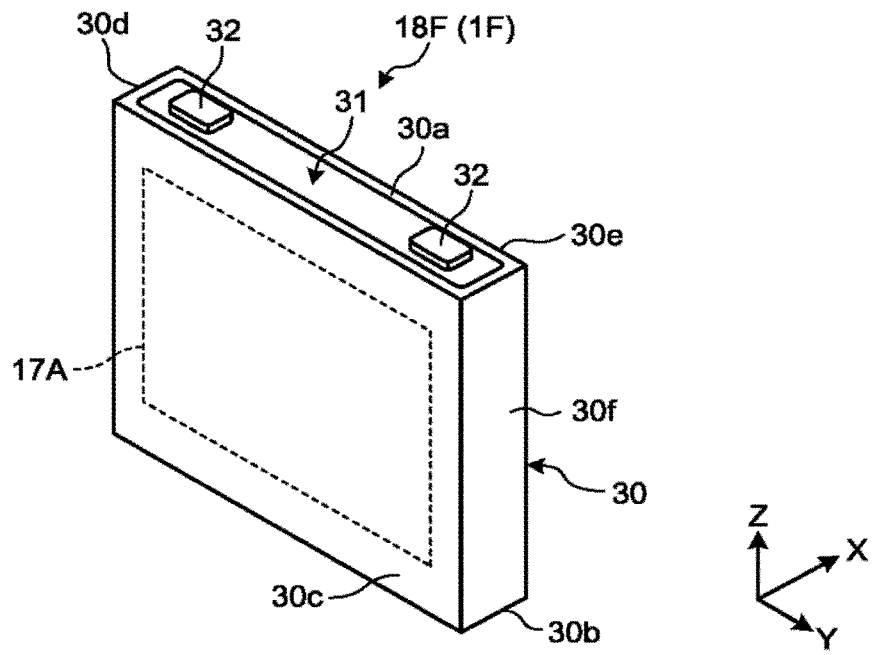
FIG. 16 is an exemplary and schematic perspective view of a connection member of a battery module according to a seventh embodiment.

In this embodiment, for example, as illustrated in FIG. 16, the body 30 of the connection member 18F is provided with no opening or lattice in the side faces 30c, 30e. Instead, the connection member 18F is provided with a space surrounded by the top face 30a, the bottom face 30b, and the four side faces 30c, 30d, 30e, 30f. A circuit board 17A is housed in this space.

The circuit board 17A has part of the function of the circuit board 17 explained above and includes a transistor with a current breaker function, such as an analog front-end (AFE) circuit or a field-effect transistor (FET) circuit. Herein, such a component having a current breaker function will be referred to as a current breaker.

The current breaker mounted on the circuit board 17A operates in accordance with current, voltage, and temperature information of the battery cells 12 from the circuit board 17. The current breaker can interrupt current path when determining that any of the current, voltage, and temperature of the battery cells 12 falls outside a preset range. The current breaker can also maintain current interruption when receiving no current, voltage, or temperature information of the battery cells 12 from the circuit board 17.

Driving power of the current breaker may be supplied from a primary or secondary battery inside the connection member 18F or the power of the battery module 1F, for example.

The current breaker may receive the current, voltage, and temperature information of the battery cells 12 via a communication line or wirelessly, instead of directly from the circuit board 17.

With such a configuration, the component requiring a large space, such as the circuit board 17 illustrated in FIG. 3, can be at least partly placed inside the connection member 18F, instead of on the top of the battery module 1F, enabling volume reduction the battery module 1F.

Large-amount heat emission of a transistor having a current breaker function is known. In the case of the circuit board 17 including a temperature measuring function for the battery cells 12, the measurements of the temperature of the battery cells 12 may be higher than accurate measurements due to the heat emission from the transistor. In such a case, since the transistor is mounted on the circuit board 17A inside the connection member 18F in the present embodiment, the distance between the location of temperature measurement and the heat generating component is increased, reducing error in the temperature measurement.

Figure 17:
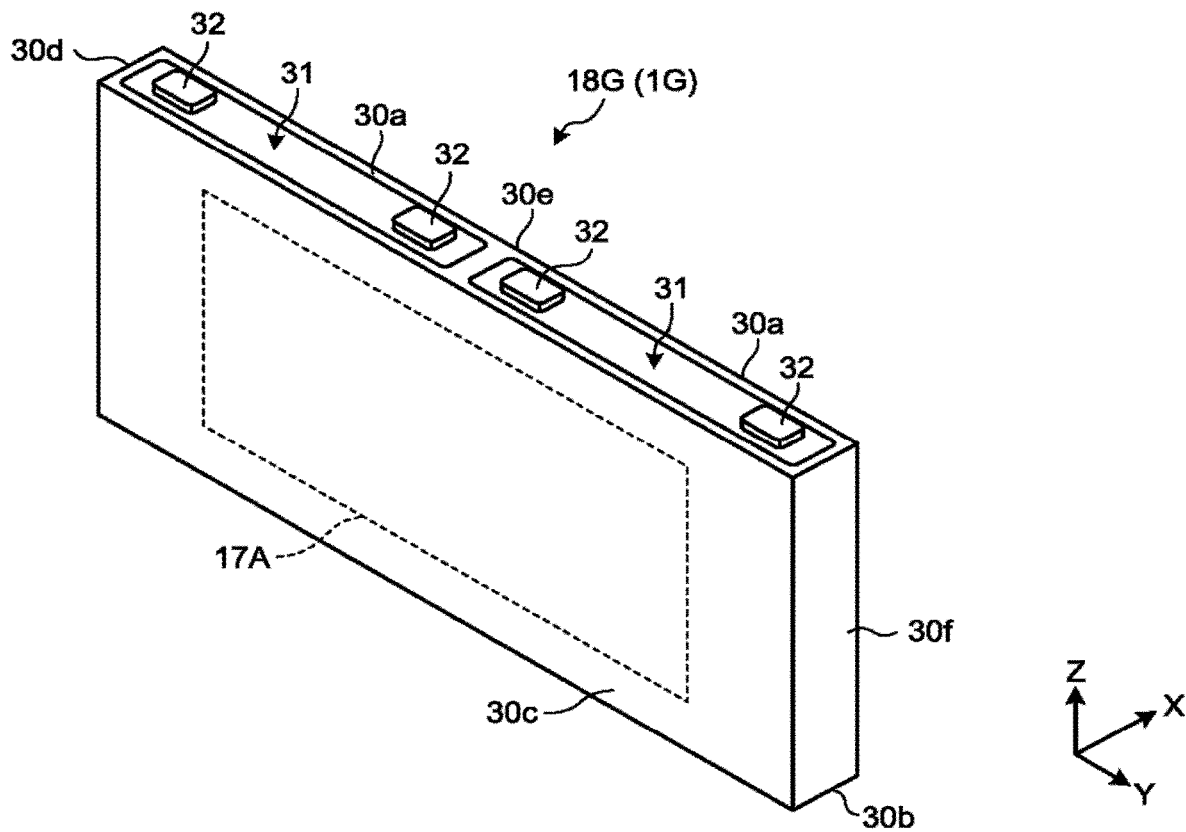
FIG. 17 is an exemplary and schematic perspective view of a connection member of the battery module in the seventh embodiment.

Although FIG. 16 shows only one connection member 18F, two or more connection members 18F may be joined together to contain the circuit board 17A, as in a battery module 1G including a connection member 18G illustrated in FIG. 17, for example. Such a connection member 18G being the connected connection members 18F can ensure a space sufficient for accommodating a component of larger size.

Eighth Embodiment

A battery module 1H including connection members 18H according to an eighth embodiment is partly different in configuration from the battery module 1 in the first embodiment. The eighth embodiment can also attain similar results (effects) based on the similar configuration, as with the first embodiment.

Figure 18:
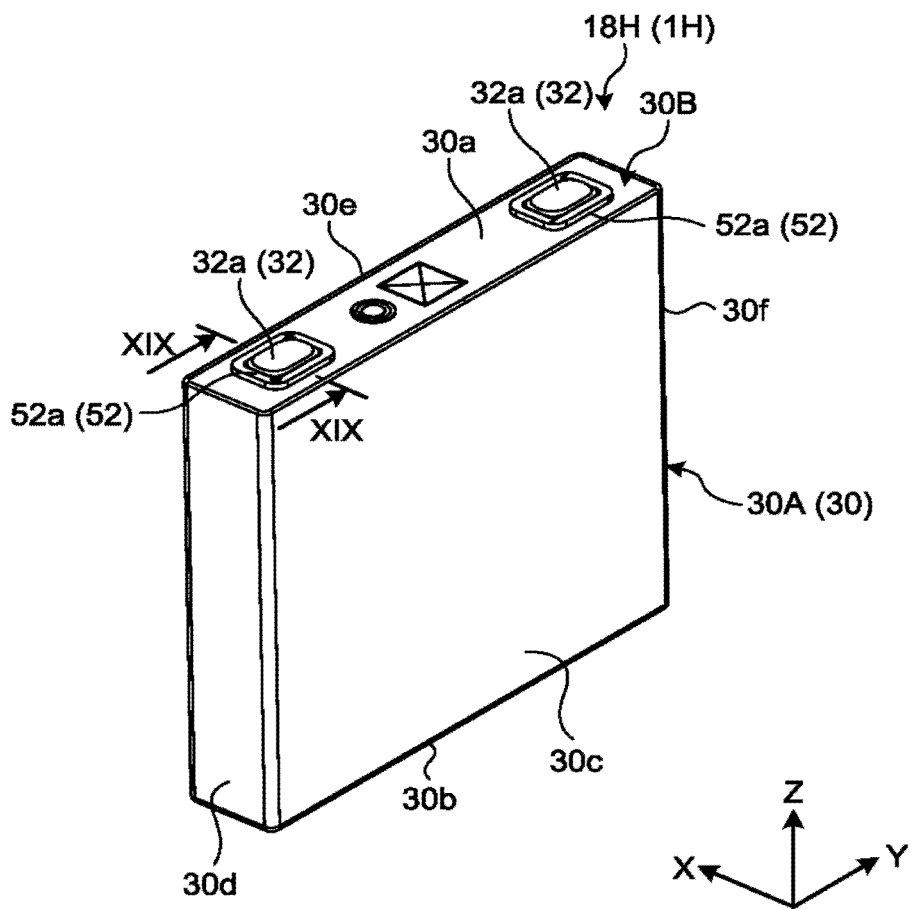
FIG. 18 is an exemplary and schematic perspective view of a connection member according to an eighth embodiment.
Figure 19:
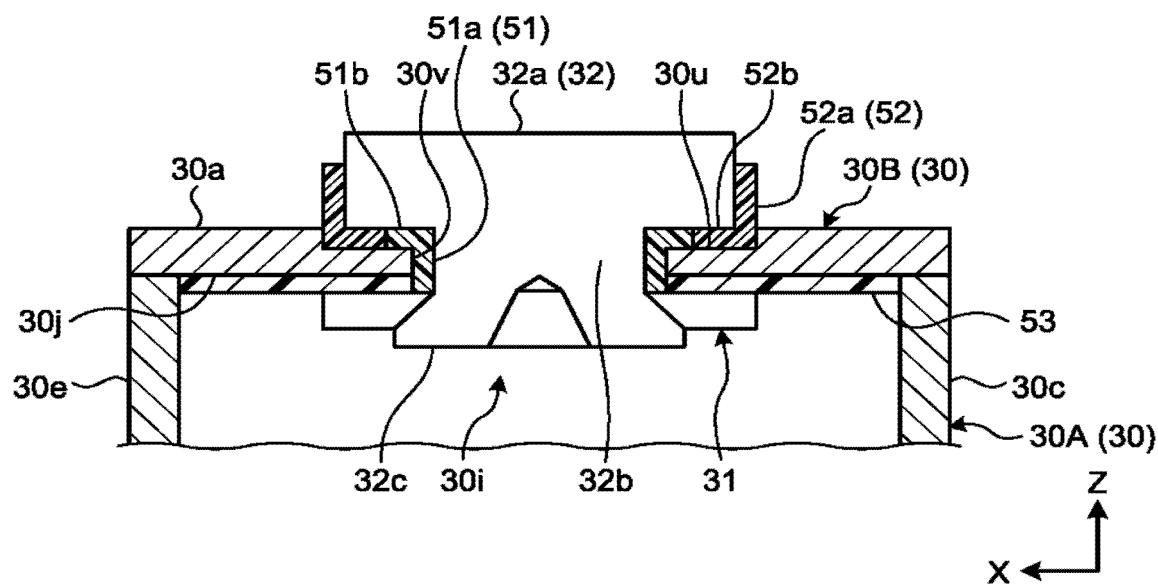
FIG. 19 is a sectional view of the connection member along the line XIX-XIX in FIG. 18.

FIG. 18 is a perspective view of the connection member 18H. FIG. 19 is a sectional view along the line XIX-XIX in FIG. 18. As illustrated in FIGS. 18 and 19, the connection member 18H includes, for example, a body 30, a first plate 31 being conductor, a pair of connection terminals 32, and a plurality of insulators 51 to 53. The pair of connection terminals 32 is exposed from the top face 30a of the body 30. The first plate 31 (conductor) is a metal plate made of aluminum or copper, for example, and is electrically connected to the pair of connection terminals 32 inside the body 30. The top face 30a is one example of a first face.

The connection member 18H is a structure having substantially the same shape as the battery cell 12, however, it includes no electrode serving as a power generating element. In the battery module 1H of the eighth embodiment, the connection members 18H are contained in the second compartments 11x2 (see FIG. 2), instead of part of the battery cells 12. This enables multiple battery modules designed to have different voltages to share the components and parts including the chassis 11 and the bus bars 13, 14. According to the embodiment, for example, required time, labor, and costs for manufacturing the battery modules 1H can be reduced, compared with the ones including parts such as the chassis 11 and the bus bars 13, 14 having different specifications depending on the rated voltage. The connection member 18H may also be referred to as a cell bus bar or a dummy battery, for example.

The body 30 has a thin flat cuboid shape in the X direction, for example. The body 30 housed in the second compartment 11x2 functions as a reinforcing member for the battery cell 12 in replace of the chassis 20. The body 30 is made of a metallic material such as aluminum, for example. The body 30 may also be referred to as a chassis, a base, or a container, for example.

As illustrated in FIG. 10, the body 30 includes, for example, a casing 30A and a lid 30B. The casing 30A has cuboid box shape with an open end (top end). In other words, the casing 30A is provided with an opening 30i (see FIG. 19) surrounded by the walls as the bottom face 30b and the side faces 30c to 30f of the body 30. The lid 30B has a long rectangular plate shape in the Y direction. The lid 30B is integrated with the casing 30A, covering the opening 30i of the casing 30A. The casing 30A and the lid 30B may be joined together by welding, for example. The casing 30A is one example of a first casing, and the lid 30B is one example of a first lid.

As illustrated in FIG. 19, the lid 30B is provided with a plurality of recesses 30u with a bottom, and open toward the top face 30a (upward). The recesses 30u have a quadrangular shape in Z-directional view, that is, from the thickness direction of the lid 30B. In this embodiment, two recesses 30u are spaced apart thereon in the Y direction, corresponding to the pair of connection terminals 32.

The recesses 30u are each provided with a through-hole 30v in the bottom face. The through-hole 30v extends from the bottom face of the recess 30u to a rear face 30j of the lid 30B opposite the top face 30a. The through-hole 30v has a circular shape in Z-directional view. Shafts 32b of the connection terminals 32 are inserted into the through-holes 30v.

The connection 32 each include, for example, a head 32a, a shaft 32b, and a joint 32c. The head 32a is connected to the shaft 32b on the top face 30a of the through-hole 30v. The joint 32c is connected to the shaft 32b on the rear face 30j of the through-hole 30v. As illustrated in FIG. 18, the head 32a has a quadrangular shape along the edge of the recess 30u. The radial width of the head 32a (XY plane) is larger than the opening width (diameter) of the through-hole 30v. The shaft 32b has a cylindrical shape along the inner circumference of the through-hole 30v.

The joint 32c is, for example, an overhang that radially (XY plane) protrudes from one end of the shaft 32b, when the connection terminal 32 and the first plate 31 (conductor) are joined together by crimping. The joint 32c overlap the first plate 31 in the Z direction, placing the first plate 31 and the insulator 51 in-between the joint 32c and the head 32a.

The insulator 51 includes, for example, a tube 51a and a flange 51b. The tube 51a is interposed between the inner circumference of the through-hole 30v and the outer circumference of the shaft 32b. In this embodiment, for example, along with the compression of the connection terminal 32 in the Z direction by crimping, the shaft 32b radially expands (along the XY plane). This holds the elastically compressed tube 51a between the outer circumference of the shaft 32b and the inner circumference of the through-hole 30v, and prevents the connection terminal 32 from radially (XY plane) moving (rattling).

The flange 51b extends from the top rim of the tube 51a along the bottom face of the recess 30u oppositely to the shaft 32b. The flange 51b is interposed between the head 32a of the connection terminal 32 and the bottom face of the recess 30u. Examples of the insulator 51 include a gasket or a seal and provides insulation between the connection terminal 32 and the lid 30B. The insulator 51 is one example of an insulating member. The insulator 51 may also be referred to as a first insulator or an inclusion, for example.

An insulator 52 includes, for example, a tube 52a and a protrusion 52b. The tube 52a is a rectangular tube following the edge of the recess 30u, for example. The tube 52a is placed in the recess 30u and is interposed between the head 32a of the connection terminal 32 and the side face of the recess 30u.

The protrusion 52b extends from the bottom end of the tube 52a toward the shaft 32b (the insulator 51) along the bottom face of the recess 30u. The protrusion 52b has a quadrangular frame shape in Z-directional view. The insulator 52 is interposed between the connection terminal 32 and the lid 30B, and covers the perimeter of the connection terminal 32. The insulator 52 is, for example, a gasket or a seal, and provides insulation between the connection terminal 32 and the lid 30B. The insulator 52 is one example of an insulating member. The insulator 52 may also be referred to as an external insulator, a se and insulator, or an inclusion, for example.

An insulator 53 is interposed between the rear face 30j of the lid 30B and the first plate 31 (conductor). The insulator 53 is, for example, a thin insulating sheet or an insulating plate, and provides insulation between the lid 30B and the first plate 31 (conductor). The insulator 53 is one example of an insulating member. The insulator 53 may also be referred to as an inner insulator, a third insulator, or an inclusion, for example.

As illustrated in FIG. 18, in this embodiment, the lid 30B is made of the same parts as the lid 20B of the battery cell (see FIG. 2). In other words, the lid 30B has the same shape as the lid 20B, and the specifications of the lid 30B are the same as those of the lid 20B. In this embodiment, the casing 30A is also made of the same parts as the casing 20A of the battery cell 12. Thus, the casing 30A has the same shape as the casing 20A, and the specifications of the casing 30A are the same as those of the casing 20A.

As described above, in this embodiment, for example, the connection member 18H includes the body 30 that is containable in the second compartment 11x2 in the chassis 11 of the battery module 1H and is partitioned in the X direction from the first compartment 11x1 accommodating the battery cell 12; the pair of connection terminals 32 placed on the top face 30a of the body 30 to be electrically connectable to the positive terminal 22 and the negative terminal 23 of the battery cell 12 via the bus bar 13; and the first plate 31 (conductor) extending across the pair of connection terminals 32. Owing to such a configuration including the body 30 containable in the second compartment 11x2 and the pair of connection terminals 32 on the top face 30a, easier, more smooth, or quicker wiring work for the connection member 18H to the chassis 11 is feasible, for example.

In this embodiment, for example, the body 30 includes the casing 30A provided with the opening 30i open in the Z direction, and the lid 30B covering the opening 30i and provided with the pair of connection terminals 32. With such a configuration, for example, it is possible to provide the body 30 containable in the second compartment 11x2 with a relatively simple structure of the separated casing 30A and lid 30B.

In this embodiment, for example, the pair of connection terminals 32 passes through the lid 30B, and the first plate (conductor) extends across the pair of connection terminals 32 inside the lid 30B. The insulators of 51 to 53 are provided between the lid 30B and the pair of connection terminals 32 and between the lid 30B and the first plate 31. Owing to the first plate 31 (conductor) and the insulators 51 to 53 placed inside the lid 30B, for example, the connection member 18H can have the same conduction path as the battery cell 12.

In this embodiment, for example, the lid 30B has the same shape as the lid 20B on which the positive terminal 22 and the negative terminal 23 of the battery cell 12 are mounted. Owing to the lid 30B with such a configuration, for example, the connection member 18H can contribute to reducing required time, labor, and costs for manufacturing the battery module 1H.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A battery module comprising:
a first chassis that includes therein a plurality of compartments partitioned in a first direction and a third direction perpendicular to the first direction;
a plurality of battery cells that is housed in first compartments from among the plurality of compartments, the battery cells having a flat cuboid shape in which a thickness in the first direction is thinner than those in a second direction and the third direction, the second direction being perpendicular to the first and third directions; and
a connection member that is housed in a second compartment from among the plurality of compartments, the connection member having a flat cuboid shape in which a thickness in the first direction is thinner than those in the second and third directions, wherein
the connection member comprises, on a first face corresponding to one side of the connection member in the second direction, a pair of connection terminals electrically connectable to electrodes of the plurality of battery cells via a and a conductor that connects the pair of connection terminals.

2. The battery module according to claim 1, wherein the second compartment is located nearer to a center than to an end of the first chassis in the first direction.

3. The battery module according to claim 1, wherein the second compartment is located at an end of the first chassis in the first direction.

4. The battery module according to claim 1, wherein the connection member is located at an end of a series circuit that is electrically connected to the plurality of battery cells via the conductive member.

5. The battery module according to claim 1, wherein the conductor includes a first plate extending along the first face.

6. The battery module according to claim 1, wherein the connection member includes a second plate that is exposed to a second face of a body, the second face opposite the first face.

7. The battery module according to claim 6, wherein at least one of the second plate and the first plate is made of the same material as that of second chassis of the battery cells.

8. The battery module according to claim 1, wherein a body is provided with a lattice having a plurality of openings that opens in the first direction.

9. The battery module according to claim 1, wherein
the first chassis includes a plurality of second compartments that is aligned in the first direction or a third direction intersecting with the first direction and the second direction,
the connection member comprises a plurality of connection members that is housed in the second compartments one by one, and
the connection members are provided with connects that are mechanically connectable to each other.

10. The battery module according to claim 1, wherein the conductor includes a fuse that blows when a current of a certain level or above flows.

11. The battery module according to claim 1, wherein the first face is provided with a mark that indicates the connection member.

12. The battery module according to claim 1, wherein the connection member includes a circuit inside that interrupts current from the battery cells based on information on at least one of current, voltage, and temperature of the battery cells.

* * * * *